US012553908B2

(12) United States Patent
Durrant et al.

(10) Patent No.: US 12,553,908 B2
(45) Date of Patent: *Feb. 17, 2026

(54) AUTOMATED SPECIMEN PROCESSING SYSTEMS AND METHODS OF DETECTING SPECIMEN-BEARING MICROSCOPE SLIDES

(71) Applicant: Ventana Medical Systems, Inc., Tucson, AZ (US)

(72) Inventors: Timothy James Durrant, Camberwell (AU); Joshua David Kenneth Harrison, Tucson, AZ (US); Benjamin Arthur James, St. Kilda (AU); Matthew Ketterer, Oro Valley, AZ (US); John Douglas Willems, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/316,204

(22) Filed: May 10, 2021

(65) Prior Publication Data

US 2021/0270857 A1 Sep. 2, 2021

Related U.S. Application Data

(60) Division of application No. 15/385,846, filed on Dec. 20, 2016, now Pat. No. 11,035,868, which is a
(Continued)

(51) Int. Cl.
*G01N 35/00* (2006.01)
*G01N 1/31* (2006.01)
*B01L 9/00* (2006.01)

(52) U.S. Cl.
CPC ....... *G01N 35/00029* (2013.01); *G01N 1/312* (2013.01); *G01N 35/0092* (2013.01);
(Continued)

(58) Field of Classification Search
CPC ......... G01N 35/00029; G01N 35/0092; G01N 35/0099; G01N 1/312; G01N 2035/00059;
(Continued)

(56) References Cited

U.S. PATENT DOCUMENTS

2002/0048810 A1* 4/2002 Heath ................. B01L 3/50825
366/131
2003/0203493 A1* 10/2003 Lemme .................. G01N 1/312
436/180
(Continued)

FOREIGN PATENT DOCUMENTS

WO  WO-2014066946 A1 * 5/2014 ............. G01N 1/312

*Primary Examiner* — Benjamin R Whatley
(74) *Attorney, Agent, or Firm* — Charney IP Law LLC; Thomas M. Finetti

(57) ABSTRACT

Systems and methods that enable automated processing of specimens carried on microscope slides are described herein. In some embodiments, the system can include, for example, a slide ejector assembly having a slide staging device configured to receive a slide and an over-travel inhibitor that includes a first vacuum port positioned to draw a first vacuum between the slide and a standby platform as the slide is moved across at least a portion of the standby platform. The over-travel inhibitor includes a first sensor for detecting a presence of the slide on the standby platform. The system can also include a transfer assembly to transport slides away from the slide ejector assembly. The transfer assembly can include a floating transfer head having a vacuum port for drawing a partial vacuum for holding the slide.

10 Claims, 32 Drawing Sheets

Related U.S. Application Data continuation of application No. PCT/EP2015/064334, filed on Jun. 25, 2015.

(60) Provisional application No. 62/018,407, filed on Jun. 27, 2014.

(52) U.S. Cl.
CPC ............ *G01N 35/0099* (2013.01); *B01L 9/52* (2013.01); *G01N 2035/00059* (2013.01); *G01N 2035/00138* (2013.01); *Y10T 436/112499* (2015.01)

(58) Field of Classification Search
CPC ............ G01N 2035/00138; B01L 9/52; Y10T 436/112499
See application file for complete search history.

(56) References Cited

U.S. PATENT DOCUMENTS

| | | | | |
|---|---|---|---|---|
| 2004/0259111 | A1* | 12/2004 | Marlowe ............ | G01N 35/0099 435/7.1 |
| 2006/0051493 | A1* | 3/2006 | Tella .................... | B01J 19/0046 118/713 |
| 2010/0040439 | A1* | 2/2010 | Temple .................. | G01N 1/312 414/222.01 |
| 2013/0203100 | A1* | 8/2013 | Otter ....................... | B01L 3/502 118/100 |
| 2015/0300931 | A1* | 10/2015 | Dockrill ............ | G01N 35/0099 435/309.1 |

* cited by examiner

AUTOMATED SPECIMEN PROCESSING SYSTEMS AND METHODS OF DETECTING SPECIMEN-BEARING MICROSCOPE SLIDES

CROSS-REFERENCE TO RELATED APPLICATIONS

This patent application is a continuation of U.S. patent application Ser. No. 15/385,846 filed on Dec. 20, 2016, which application is a continuation of International Patent Application No. PCT/EP2015/064334 filed Jun. 25, 2015, which claims priority to and the benefit of United States Provisional Application Number U.S. 62/018,407, filed Jun. 27, 2014. Each of the above patent applications is incorporated herein by reference as if set forth in its entirety.

TECHNICAL FIELD

This disclosure relates to systems for preparing specimens for analysis. In particular, the disclosure relates to specimen processing systems and methods of processing specimens.

BACKGROUND

A wide variety of techniques have been developed to prepare and analyze biological specimens. Example techniques include microscopy, microarray analyses (e.g., protein and nucleic acid microarray analyses), and mass spectrometric methods. Specimens are prepared for analysis by applying one or more liquids to the specimens. If a specimen is treated with multiple liquids, both the application and the subsequent removal of each of the liquids can be important for producing samples suitable for analysis.

Microscope slides bearing biological specimens, e.g., tissue sections or cells, are often treated with one or more dyes or reagents to add color and contrast to otherwise transparent or invisible cells or cell components. Specimens can be prepared for analysis by manually applying dyes or other reagents to specimen-bearing slides. This labor-intensive process often results in inconsistent processing due to individual techniques among laboratory technicians.

Immunohistochemical and in situ hybridization staining processes are often used to prepare tissue specimens. The rate of immunohistochemical and in situ hybridization staining of sectioned fixed tissue on a microscope slide is limited by the speed at which molecules (e.g., conjugating biomolecules) can diffuse into the fixed tissue from an aqueous solution placed in direct contact with the tissue section. Tissue is often "fixed" immediately after excision by placing it in a 10% solution of formaldehyde, which preserves the tissue from autocatalytic destruction by cross-linking much of the protein via methylene bridges. This cross-linked tissue may present many additional barriers to diffusion, including the lipid bilayer membranes that enclose individual cells and organelles. Conjugate biomolecules (antibody or DNA probe molecules) can be relatively large, ranging in size from a few kilodaltons to several hundred kilodaltons, which constrains them to diffuse slowly into solid tissue with typical times for sufficient diffusion being in the range of several minutes to a few hours. Typical incubation conditions are 30 minutes at 37 degrees centigrade. The stain rate is often driven by a concentration gradient so the stain rate can be increased by increasing the concentration of the conjugate in the reagent to compensate for slow diffusion. Unfortunately, conjugates are often very expensive, so increasing their concentration is wasteful and often not economically viable. Additionally, the excessive amount of conjugate that is driven into the tissue, when high concentrations are used, is entrapped in the tissue, is difficult to rinse out, and causes high levels of non-specific background staining. In order to reduce the noise due to non-specific background staining and increase the signal of specific staining, low concentrations of conjugate with long incubation times are often used to allow the conjugate to bind only to the specific sites.

Overview of Technology

Some aspects of the technology are directed, for example, to automated specimen processing systems and methods of detecting and transporting specimen-bearing microscope slides in automated processing systems. In at least some embodiments, the system can include an ejector assembly having a slide staging device configured to receive a slide. The ejector assembly can include, for example, an over-travel inhibitor that includes a vacuum port positioned to draw a vacuum between the slide and a standby platform as the slide is moved across at least a portion of the standby platform. In one embodiment, the over-travel inhibitor can include a sensor for detecting a presence of the slide on the standby platform. The sensor can, for example, detect an increase in pressure from a baseline pressure when the slide is present on the standby platform.

Other embodiments of the technology are directed to a slide staging device that can include a standby platform configured to receive a microscope slide. The slide staging device can also include a first vacuum assembly configured to draw a first vacuum to retain the microscope slide on the standby platform. The first vacuum assembly can include, for example, and first sensor for detecting the presence of the microscope slide on the standby platform. The system can also include a transfer head configured to transport microscope slides from the standby platform to a specimen processing station. The transfer head, in some embodiments can have a second vacuum assembly configured to draw a second vacuum between the microscope slide and the transfer head. The second vacuum assembly can include, for example, a second sensor for detecting the presence of the microscope slide at a bottom surface of the transport head. The system can further include a controller in communication with the first and second vacuum assemblies.

Further embodiments of the present technology are directed to methods of detecting specimen-bearing microscope slides in an automated processing system. In one embodiment, the method can include sequentially moving a plurality of specimen-bearing microscope slides from a carrier to a slide staging device. The method can further include drawing a vacuum from a pressurization source through a vacuum port in a standby platform, and sensing a presence of individual specimen-bearing microscope slides at the standby platform when a vacuum sensor detects an increase in vacuum pressure between the vacuum port and the pressurization source.

At least some embodiments of the technology are directed to automated specimen processing systems capable of processing specimens carried on slides. At least some embodiments include an automated specimen processing system comprising a slide ejector assembly. The slide ejector assembly can include a slide staging device configured to receive a slide. The slide ejector assembly can also include a slide alignment device configured to engage the slide at a plurality of contact points to move the slide from a misaligned position to an aligned position. In one embodiment, the slide alignment device can include a first aligning member and a second aligning member positioned opposite the first aligning member. The first and second aligning members can be movable between an open position for receiving a slide and a closed position for aligning and/or holding the slide.

The first aligning member, in some embodiments, can include a first contact region and a second contact region for engaging a first edge of the slide. The second aligning member, in some embodiments, can include a third contact region for engaging a second edge of the slide opposite the first edge. In various embodiments, the slide alignment device is configured to engage the slide at three points of contact. In one example, a point of contact can be a small discrete area of the slide contacted by one of the first, second, or third contact regions. In one embodiment, the slide can be moved from the misaligned position to the aligned position on a standby platform by pivoting the slide about a point (e.g., a midpoint) between the three points of contact. In another embodiment, moving the slide from the misaligned position to the aligned position includes aligning a slide longitudinal axis with a standby platform longitudinal axis.

In some embodiments, an over-travel inhibitor and a slide holding region positioned between the over-travel inhibitor and slide ejector. The over-travel inhibitor can be positioned, for example, to inhibit movement of the slide past the slide holding region. In one embodiment, the over-travel inhibitor includes a vacuum port positioned to draw a vacuum between a slide and the standby platform as the slide is moved across at least a portion of the standby platform. In another embodiment, the over-travel inhibitor can include a sensor for detecting a presence of the slide on the standby platform.

At least some embodiments of the automated specimen processing system include at least one specimen processing station and a transfer head configured to transport slides from a standby platform to specimen processing station. The transfer head, in one embodiment, can include a head alignment feature receivable by at least one of a corresponding alignment feature of the slide staging device and/or an alignment feature of the specimen processing station. In one embodiment, the head alignment feature includes a first alignment pin and a second alignment pin and the corresponding alignment feature of the slide staging device includes a first opening and a second opening positioned to receive the first alignment pin and the second alignment pin, respectively. The transfer head, in further embodiments, can include a capture feature configured to engage the slide and transport the slide in the aligned position. For example, the capture feature can include a vacuum port positioned to draw a vacuum between an upper surface of the slide and the transfer head as the slide is transported.

At least some embodiments of an automated specimen processing system include a controller communicatively coupled to the slide ejector assembly. The controller, for example, can be programmed to command the slide alignment device to move the first aligning feature in a first direction toward a standby platform and to move a second aligning feature in a second direction opposite the first direction toward the standby platform to engage a slide at a plurality of contact points to move the slide. The controller can also be programmed to command the slide alignment device to move the first aligning feature in the second direction and the second aligning feature in the first direction to release the slide in the aligned position. In another embodiment, the controller can be programmed to control a transfer head to align with the slide staging device and to transport the slide from the standby to a specimen processing station.

At least some of the embodiments of the technology are directed to an automated specimen processing system comprising a slide staging device and a transfer head. In one embodiment, the slide staging device can include a standby platform configured to receive a microscope slide and an alignment device having a first aligning member and a second aligning member positioned opposite the first aligning member. The alignment device, in some embodiments, is configured to engage the microscope slide at a plurality of contact points for moving the slide from a misaligned position to an aligned position. In some arrangements, the transfer head can be configured to transport microscopes slides from the standby platform to a specimen processing station. The transfer head, for example, can have a head alignment feature receivable by at least one of a corresponding alignment feature of the slide staging device and/or an alignment feature of the specimen processing station. In various embodiments, the first aligning member can have a first contact region and a second contact region for engaging a first edge of the microscope slide, and the second aligning member can have a third contact region for engaging a second edge of the microscope slide opposite the first edge.

Some of the embodiments of the technology are directed to methods of transporting specimen-bearing microscope slides in an automated processing system. In one embodiment, the method comprises sequentially moving a plurality of specimen-bearing microscope slides from a carrier to a slide staging device. The individual specimen-bearing microscope slides can be aligned with a longitudinal axis at the slide staging device by engaging the individual specimen-bearing microscope slides at a plurality of contact points. Optionally, after moving individual specimen-bearing microscope slides from the carrier to the slide staging device, a vacuum is drawn through an over-travel inhibitor to capture the specimen-bearing microscope slide on a standby platform of the slide staging device, and detecting the presence of the slide on the standby platform. In some embodiments, the method further includes transporting the individual specimen-bearing microscope slides from the slide staging device to one or more specimen processing stations.

In some embodiments, transporting individual specimen-bearing microscope slides includes aligning a transfer head of a transport assembly with the slide staging device and picking up the individual specimen-bearing microscope slides from the slide staging device while maintaining the aligned position. In other embodiments, prior to transporting the individual specimen-bearing microscope slides, alignment features of a transport assembly can be aligned with corresponding alignment features at the slide staging device. In further embodiments, transporting the individual specimen-bearing microscope slides includes drawing a vacuum between the individual specimen-bearing slides and a transport assembly configured to transport the specimen-bearing slides to the one or more specimen processing stations.

At least some embodiments of the technology are directed to an automated slide processing apparatus configured to apply at least one reagent to a specimen carried by a microscope slide. A slide processing station can include a support element with a support surface, at least one port, and a sealing member having a non-round shape (e.g., as viewed from above). The sealing member can be moveable between an uncompressed state and a compressed state. In the uncompressed state, the sealing member can extend upwardly beyond the support surface. In the compressed state, the sealing member can be configured to maintain a seal with a backside of the microscope slide as the microscope slide is urged against the support surface by a vacuum drawn via the at least one port. The sealing member, in some embodiments, can have a rounded-corner rectangular shape (e.g., a shape with rounded corners with radii less than the lengths of straight sides) or a rectangular shape as viewed from above. In one embodiment, the sealing member has a rounded-corner polygonal shape or a polygonal shape as viewed along an axis generally perpendicular to the support surface.

In some embodiments, at least a portion of the support element can have a non-round shape and can extend between the sealing member and the at least one vacuum port. In one embodiment, the support element includes a trench, and the sealing member includes a compliant gasket having a main body and a lip. The main body can be positioned in the trench, and the lip can extend radially outward from the main body. In some embodiments, the lip can be moveable between a compressed configuration and a uncompressed configuration. In the uncompressed configuration, the lip can extend upwardly from the trench. In the compressed configuration, the lip can extend toward a sidewall of the trench. In one embodiment, the lip is movable between the uncompressed configuration and the compressed configuration without contacting the sidewall of the trench. When the microscope slide is drawn against the support surface, the lip can be spaced apart from a sidewall of the trench but capable of physically contacting the sidewall of the trench to inhibit movement of the microscope slide relative to the support element. In one embodiment, the lip is sufficiently stiff to prevent any rotation of the slide about a vertical axis. As such, the slide is rotationally fixed relative to the support surface. In one embodiment, the lip is configured to physically contact the sidewall when the microscope slide is rotated at least about 2 degrees about a vertical axis.

The sealing member in the compressed configuration can be positioned on one side of a plane in which a backside surface of the microscope slide is located when the microscope slide is pulled against the support surface. In the uncompressed configuration, the sealing member can be located on both sides of the plane. The support element can include a vacuum surface surrounded by at least one vacuum port. The vacuum surface can be spaced apart from and positioned below the plane such that the vacuum surface and the microscope slide at least partially define a vacuum chamber with a height less than a height of the sealing member.

In some embodiments, the sealing member can include a lip configured to deflect primarily in a direction perpendicular to a backside surface of the microscope slide during use. The lip can be movable between an uncompressed configuration for contacting the slide moving toward the support surface and a compressed configuration for maintaining an airtight seal. In the uncompressed position, the lip can extend upwardly beyond the support surface. In the compressed position, the lip can be positioned at or below the support surface. In some embodiments, the lip can be configured to be deflected as the microscope slide moves toward the support surface to form the airtight seal with the slide. The sealing member, in some embodiments, can be positioned to be located under a label of the microscope slide during use.

In some embodiments, the automated slide processing system includes a sensor, such as a vacuum sensor, configured to detect the presence of a slide on the support element. For example, the vacuum source can be fluidly connected with a vacuum inlet associated with any one of a plurality of slide carrying surfaces, including, but not limited to, the slide ejector assembly, the transport assembly, on more specimen processing stations, and the specimen return mechanism. The vacuum source and/or the inlet may include a sensor, such as a pressure or vacuum sensor. In one embodiment, the sensor can be calibrated to a baseline pressure and configured to report an increase in vacuum pressure as indicative of slide presence on the support element. Likewise, a subsequent decrease in vacuum pressure detected by the sensor can be reported by the sensor as indicative of slide absence (e.g., due to transfer) from the support element. Positive indication of the presence of a slide in any one of several locations within the automated processing system can ensure that automated steps are completed before a next round of automated activity is initiated.

At least some embodiments include a specimen processing system comprising a slide ejector assembly for removing slides from a slide carrier. The slide ejector assembly includes a carrier handler, a slide staging device, and an actuator assembly. The carrier handler is configured to receive and hold a slide carrier holding a plurality of slides. The slide staging device includes a standby platform and a slide alignment device configured to move a slide at the standby platform from a misaligned position to an aligned position. The actuator assembly includes a slide ejector positioned to move relative to the slide carrier to transfer individual slides from the slide carrier to the standby platform. The slides can thus be transferred to the standby platform without the use of, for example, mechanical gripper or suction cup devices that pull slides from one location to another location.

The carrier handler, in some embodiments, is configured to move the slide carrier relative to the slide ejector so as to sequentially stage one of the slides for delivery to the standby platform. In some embodiments, the carrier handler includes a carrier receiver and a receiver rotator. The receiver rotator is capable of rotating the slide carrier from a vertical slide orientation to a horizontal slide orientation. In one embodiment, the carrier handler includes a carrier receiver movable between a load position for loading a slide carrier and a slide unload position. The carrier handler can comprise a receiver rotator and a transport device. The receiver rotator is coupled to the carrier receiver and is operable to move the slide carrier held by the carrier receiver from a vertical slide orientation to a horizontal slide orientation. The transport device is configured to vertically move the slide carrier, which is in the horizontal slide orientation, between the slide ejector and the standby platform.

The slide staging device, in some embodiments, includes an ejector stop positioned to prevent movement of the slide ejector past an end of a slide holding region of the standby platform. The slide ejector can be movable from a first position to a second position. In some embodiments, the slide ejector moves through the slide carrier to push slides out of the slide carrier.

The standby platform can include a slide holding region and an over-travel inhibitor. The slide holding region is positioned between the over-travel inhibitor and the slide ejector. The slide ejector is positioned to move slides one at a time from the slide carrier toward the over-travel inhibitor. In some embodiments, the over-travel inhibitor includes a vacuum port positioned to draw a vacuum between a slide and the standby platform as the slide is moved by the slide ejector across at least a portion of the standby platform.

The slide alignment device, in some embodiments, includes a pair of jaws movable between an open position for receiving a slide and a closed position for aligning the slide. In one embodiment, the jaws center the slide relative to a raised slide holding region of the standby platform when the jaws move from the open position to the closed position.

The actuator assembly includes a reciprocating drive mechanism coupled to the slide ejector and configured to move the slide ejector so as to push a slide out of the slide carrier and onto the standby platform. In some embodiments, the slide ejector is moveable across a slide carrier receiving gap that is between the actuator assembly and the slide staging device.

The specimen processing system, in some embodiments, can further include one or more specimen processing stations and one or more transfer heads. The transfer heads can be configured to transport slides from the standby platform to one of the specimen processing stations. In some embodiments, at least one of the transfer heads can have a head alignment feature receivable by at least one of an alignment feature of the slide staging device and/or an alignment feature of the specimen processing station. In some embodiments, the head alignment feature includes a first alignment pin and a second alignment pin. The alignment feature of the slide staging device can include a first opening and a second opening. The first opening and the second opening are positioned to receive the first alignment pin and the second alignment pin, respectively. In some embodiments, the alignment feature of the specimen processing station can include a first opening and a second opening, and the first opening and the second opening are positioned to receive the first alignment pin and the second alignment pin, respectively, of the head alignment feature.

The specimen processing system, in some embodiments, can further include a controller communicatively coupled to the slide ejector assembly. The controller can be programmed to command the actuator assembly to move a first slide that is positioned below a second slide from the slide carrier to the standby platform and being programmed to move the second slide to the standby platform after moving the first slide to the standby platform.

In some embodiments, a method of transporting specimen-bearing microscope slides includes delivering a carrier containing a plurality of specimen-bearing microscope slides to an ejector assembly. The carrier moves toward a slide staging device of the ejector assembly. The specimen-bearing microscope slides are sequentially moved from the carrier to the slide staging device. The slide staging device moves from a receive slide configuration to an align slide configuration to move the individual specimen-bearing microscope slides at the slide staging device to an aligned position. The individual specimen-bearing microscope slides are transported from the slide staging device of the ejector assembly to one or more specimen processing stations.

The carrier, in some embodiments, can be rotated to move the plurality of specimen-bearing microscope slides from a first orientation to a second orientation. In some embodiments, the first orientation is a substantially vertical orientation and the second orientation is a substantially horizontal orientation.

The specimen-bearing microscope slides, in some embodiments, can be sequentially moved from the carrier to the slide staging device by pushing the specimen-bearing microscope slides onto and along the slide staging device. Additionally or alternatively, a lowermost specimen-bearing microscope slide held by the carrier to the slide staging device. This process can be repeated until most or all of the slides have been removed from the slide carrier.

In certain embodiments, individual specimen-bearing microscope slides can be carried from the slide staging device to the specimen processing stations which are configured to individually process the specimen-bearing microscope slides. Additionally or alternatively, the specimen-bearing microscope slides can be sequentially moved from the carrier to the slide staging device by moving a first specimen-bearing microscope slide from the carrier to the slide staging device. After transporting the first specimen-bearing microscope slide away from the slide staging device, a second specimen-bearing microscope slide is transported from the carrier to the slide staging device.

The slide staging device, in some embodiments, can be moved from the receive slide configuration to the align slide configuration by moving a pair of jaws from an open position to a closed position to contact and move a specimen-bearing microscope slide positioned between the jaws from a misaligned position to an aligned position. In certain embodiments, the jaws can center the slide relative to a raised portion of the slide stage device upon which the slide rests.

The specimen-bearing microscope slides, in some embodiments, are sequentially moved from the carrier by (a) pushing the specimen-bearing microscope slide at the slide ejection position such that the specimen-bearing microscope slide moves onto the slide staging device and (b) repeating process (a) until the carrier is empty. In one embodiment, an elongated ejector is moved through the carrier (e.g., a basket) to push the slides onto the slide staging device.

A vacuum can be drawn between the individual specimen-bearing microscope slides and the slide staging device. For example, a sufficient vacuum can be drawn to inhibit or limit movement of the slide along the slide staging device. The vacuum can be reduced or eliminated to remove the slide from the slide staging device.

The carrier, in some embodiments, is a slide rack that includes shelves that hold specimen-bearing microscope slides in a spaced apart arrangement. The specimen-bearing microscope slides can be sequentially moved from the carrier to the slide staging device by indexing the shelves at a slide removal position adjacent to a platform of the slide staging device. In some embodiments, a slide at the slide removal position is slightly higher than the slide staging device.

The specimen-bearing microscope slides can be sequentially moved from the carrier by (a) reciprocating a slide ejector between an initial position and an eject position to move at least one of the specimen-bearing microscope slides from the carrier to the slide staging device and (b) repeating process (a) to remove at least most of the specimen-bearing microscope slides from the carrier. In some embodiments, all the specimen-bearing microscope slides are removed from the carrier using the slide ejector.

In some embodiments, a slide processing apparatus for processing a specimen carried by a slide includes a staining module. The staining module includes a slide holder platen, an opposable element, and an opposable actuator. The slide holder platen has a first sidewall, a second sidewall, and a slide receiving region between the first sidewall and the second sidewall. A slide is positioned on the slide receiving region. The slide includes a first edge and an opposing second edge. The opposable element is disposed proximate to the slide and includes a first edge portion and an opposing second edge portion. The opposable actuator holds the opposable element to form a capillary gap between the opposable element and the slide. The first edge portion of the opposable element is closer to the first sidewall than the first edge of the slide. The second edge portion of the opposable element is closer to the second sidewall than the second edge of the slide.

The slide processing apparatus, in some embodiments, includes a dispenser positioned to deliver a supplemental liquid between the opposable element and the slide while a liquid is held in the gap there between. Additionally, the slide processing apparatus can include a controller communicatively coupled to the dispenser and programmed to command the dispenser such that the dispenser delivers the supplemental liquid to keep a volume of liquid between the opposable element and the slide within an equilibrium volume range. In some embodiments, the controller is programmed to deliver supplemental liquid at a predetermined rate. In one embodiment, the predetermined rate is equal to or less than about 110 μL per minute at a temperature of about 37° C. for bulk liquids. In some embodiments, the predetermined rate is equal to or less than about 7 μL per minute at a temperature of about 37° C. for non-bulk reagents. The rate can be selected based on the specimen staining protocol being processed.

The slide processing apparatus, in some embodiments, further comprises a plurality of additional staining modules and a controller configured to independently control each of the staining modules. The staining modules can use disposable or reusable opposable elements to spread and move reagents across the specimens.

BRIEF DESCRIPTION OF THE DRAWINGS

Non-limiting and non-exhaustive embodiments are described with reference to the following drawings. The same reference numerals refer to like parts or acts throughout the various views, unless otherwise specified.

DETAILED DESCRIPTION OF DRAWINGS

Figure 1A:
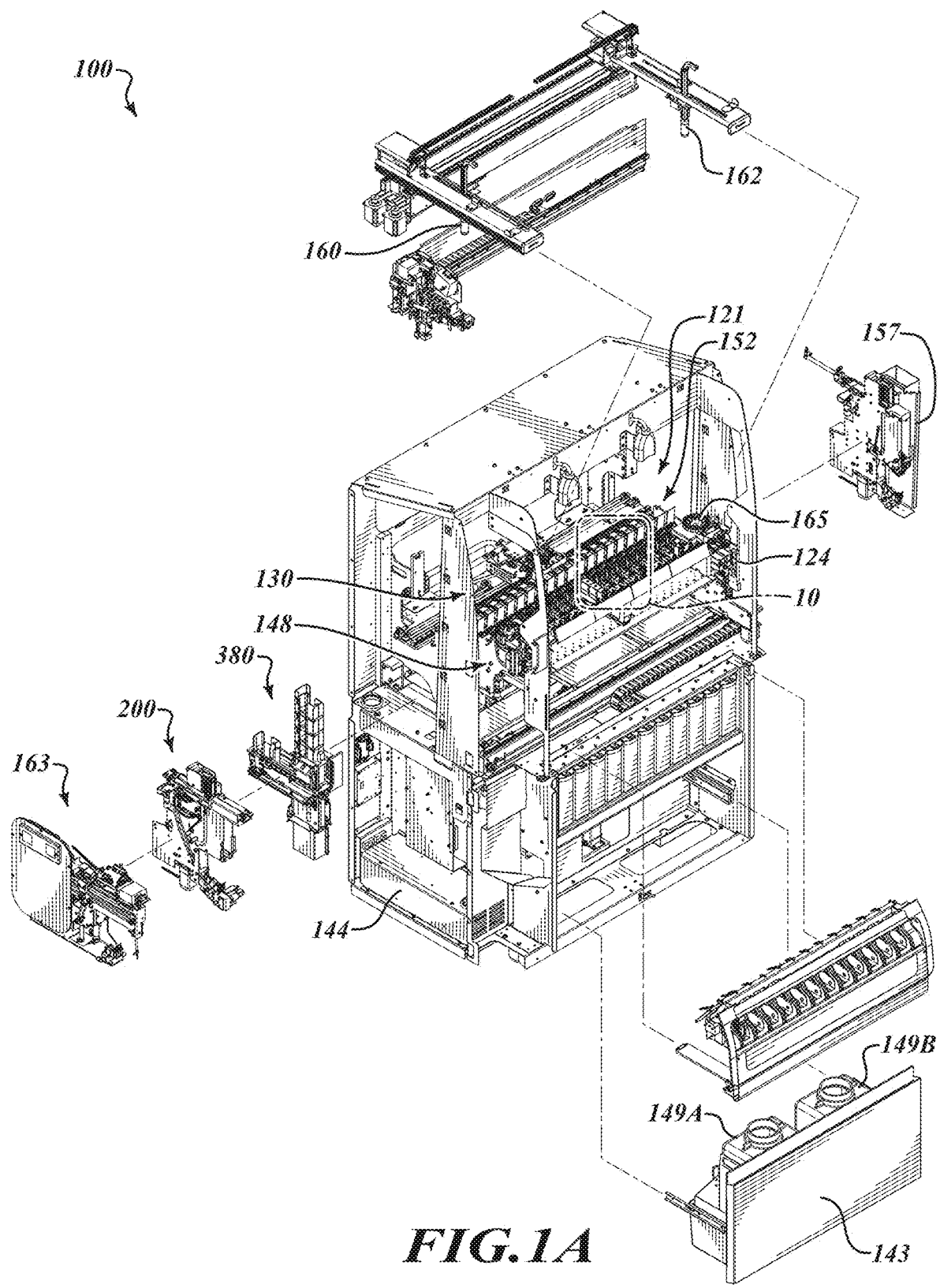
FIG. 1A is an exploded isometric view of a specimen processing system. Portions of a protective housing are shown removed.

FIG. 1A is an isometric exploded view of the specimen processing system 100 including a processing station 163, a slide ejector assembly 200, an opposable dispenser 380, and a specimen return mechanism 157. The processing station 163, the slide ejector assembly 200, and the opposable dispenser 380 are positioned at the left side of an internal environment 121. The specimen return mechanism 157 is positioned at the right side of the internal environment 121. A mixing station 165 is positioned generally below the specimen return mechanism 157 and can include reservoirs (e.g., reservoir wells). Reagents can be mixed in the mixing station 165. In other embodiments, the mixing station 165 can hold containers (e.g., vials, beakers, etc.) in which substances are stored and/or mixed. A row 152 of 20 specimen processing stations can independently process biological specimens.

In operation, a user can load slide carriers carrying specimen-bearing slides into the empty bays of the parking station 124 or 148 of FIG. 1A and can load opposable carriers carrying opposables into a loading station 130. The slide carriers can be transferred to a reader (e.g., a label reader, a barcode reader, etc.), not shown that reads labels, if any, on the slides. The slide carriers can be delivered to the processing station 163 which can include, without limitation, a dryer (e.g., a dehydration unit), a heating unit (e.g., a baking module), or other component capable of removing water from the slides, heating specimens (e.g., heating specimens to adhere the specimens to the slides), or the like. In some embodiments, the processing station 163 blows hot air over slides to dry the slides, and if the specimens contain paraffin, the hot air can soften the paraffin to promote adhesion of the specimens to the slides. An air system can partially recirculate air to control the humidity in the processing station 163. Slide carriers can be picked up and transported from the processing station 163 to another module (e.g., a specimen processing station, a label reader, etc.) or returned to one of the bays of the parking station 124 or 148.

The specimen return mechanism 157 can load specimen-bearing slides into a slide carrier. The loaded slide carriers can be transported to the parking station 124 or 148. If the slide carriers are compatible with an automated coverslipper, a user can transport the slide carriers from the parking station 124 or 148 to an automated coverslipper for coverslipping. Alternatively, the slides can be manually coverslipped. The coverslipped slides can be analyzed using optical equipment, e.g., a microscope or other optical devices.

Figure 1B:
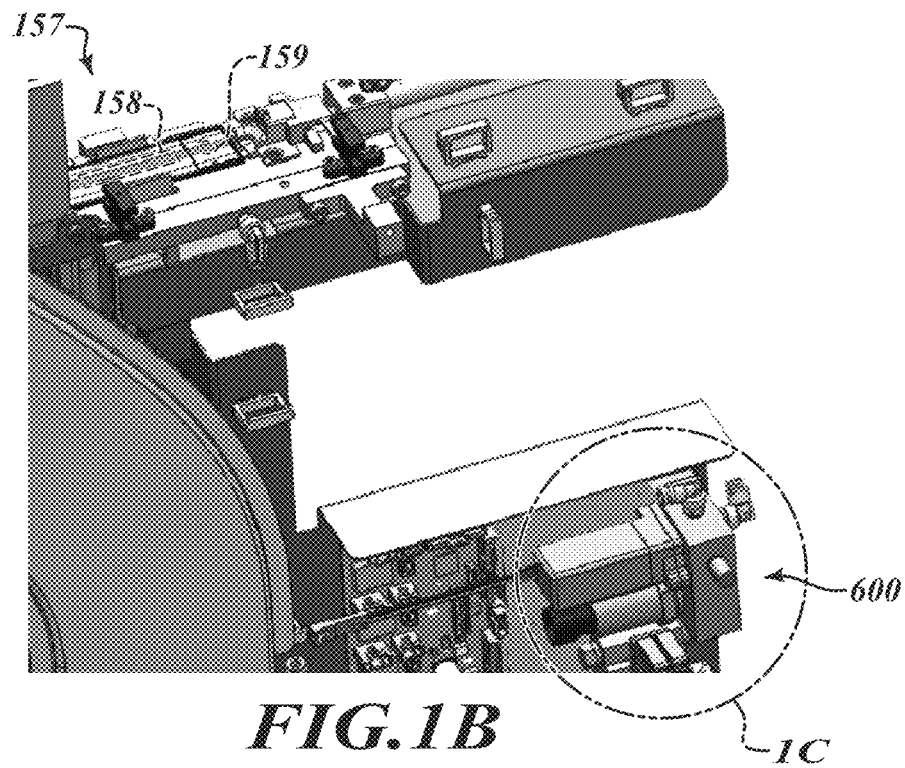
FIG. 1B is an isometric view of the slide holding area and portions of the specimen return mechanism of FIG. 1A.
Figure 1C:
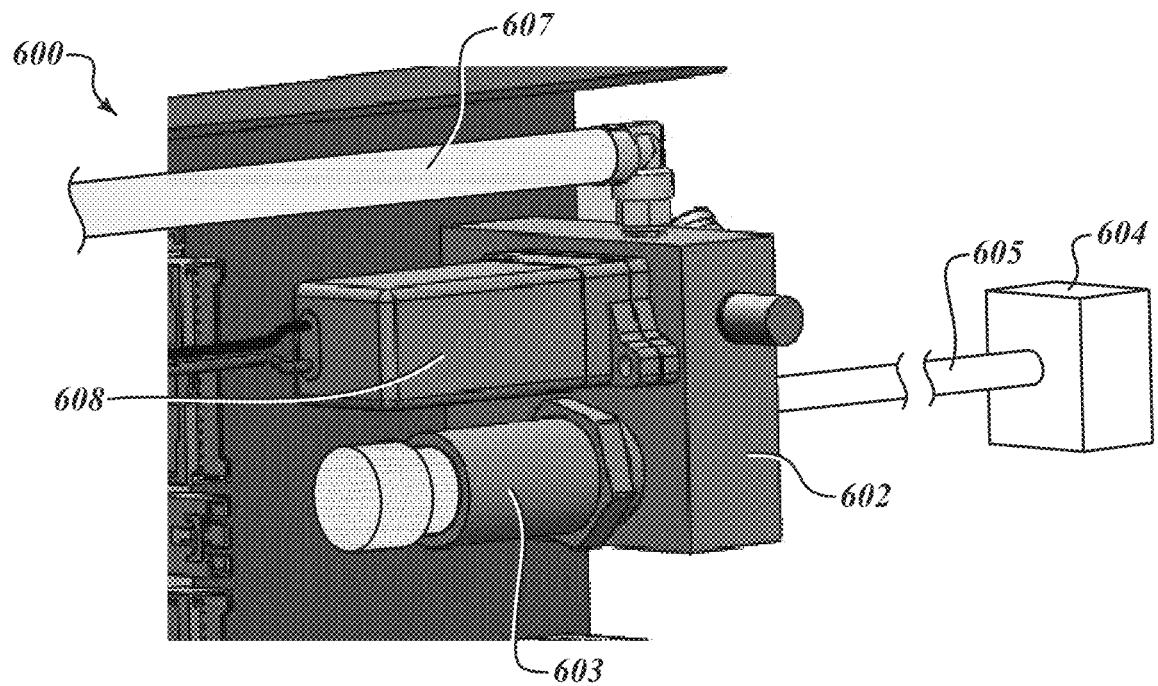
FIG. 1C is an isometric view of a vacuum system on the specimen return mechanism shown in FIG. 1B.

Transport of the specimen-bearing slides between various components of the automated specimen processing system 100 can be accomplished using a plurality of manifold assemblies configured to draw and sense a vacuum from a vacuum port on a slide holding surface when a slide is present. For example, FIG. 1B illustrates the slide holding surface 158 of the specimen return mechanism 157 illustrated in FIG. 1A in accordance with an embodiment of the present technology. A microscope slide 243 is retained by the slide holding surface 158 via a vacuum drawn through a vacuum port 159 disposed in the slide holding surface 158 (e.g., aligned with a label region of the slide) and fluidly connected to a vacuum system 600. FIG. 1C is an isometric view of the vacuum system 600 shown in FIG. 1B in accordance with an embodiment of the present technology.

The vacuum system 600 can include a manifold 602 having one or more valves 603 and fluidly coupled to a pressurization source 604 via a fluid line 605. The manifold 602 can be configured to draw a vacuum through the vacuum port 159 (FIG. 1B) via fluid line 607. The vacuum system 600 can also include a sensor 608 configured to detect the presence of a slide 243 on the slide holding surface 158 of the specimen return mechanism 157 (FIG. 1B). The sensor 608, for example, can be gauged to sense a baseline pressure (e.g., vacuum draw through vacuum port 159 when no slide is present) and recognize an increase in the pressure as confirmation of the presence of a slide 243 on the slide holding surface 158. Positive detection of the presence of a slide 243 by the sensor 608 can ensure that the automated steps do not progress until previously steps have been completed. In other embodiments, however, the sensor 608 can be configured along the fluid line 607 and/or proximal to the vacuum port 159 for the detection of pressure changes associated with the vacuum port 159. As described in more detail below, the processing station(s) 163, the slide ejector assembly 200, as well as a slide transfer assembly 410 (not shown) that transfers slides between stations can be provided with similar vacuum systems and sensors.

Figure 2:
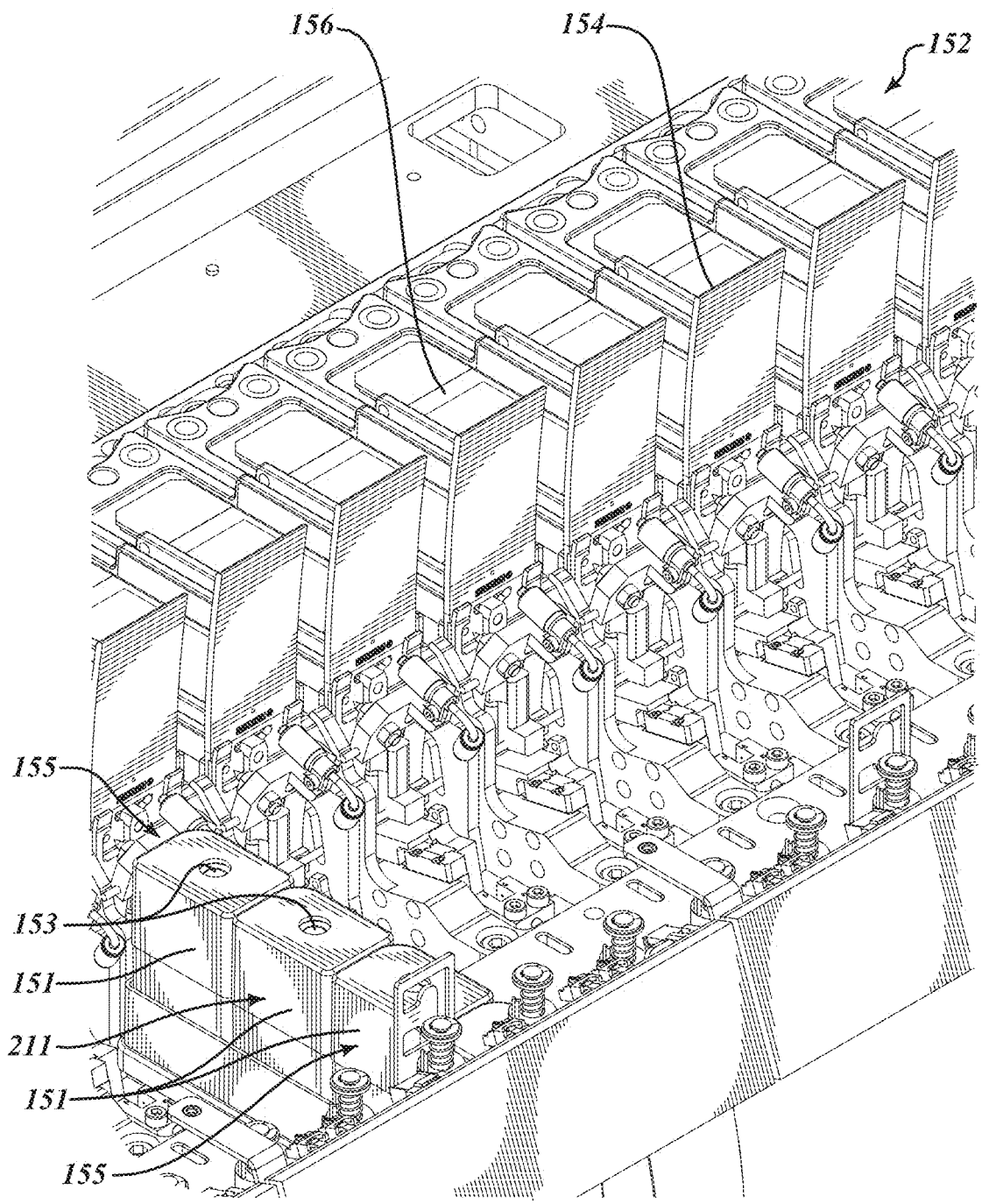
FIG. 2 is a detailed view of a portion of the specimen processing system of FIG. 1A.

FIG. 2 is a detailed view of a section of the row 152. An opposable element 154 ("opposable 154") can move substance along a slide 156 to contact a specimen on the slide 156. In some embodiments, including the illustrated embodiment, 20 slides can be processed independently using a series of substances.

If a specimen is a biological sample embedded in paraffin, the sample can be deparaffinized using appropriate deparaffinizing fluid(s). After removing the deparaffinizing fluid(s), any number of substances can be successively applied to the specimen using the opposable 154. Fluids can also be applied for pretreatment (e.g., protein-crosslinking, exposing nucleic acids, etc.), denaturation, hybridization, washing (e.g., stringency washing), detection (e.g., linking a visual or marker molecule to a probe), amplifying (e.g., amplifying proteins, genes, etc.), counterstaining, or the like. In various embodiments, the substances include, without limitation, stains (e.g., hematoxylin solutions, eosin solutions, or the like), wetting agents, probes, antibodies (e.g., monoclonal antibodies, polyclonal antibodies, etc.), antigen recovering fluids (e.g., aqueous- or non-aqueous-based antigen retrieval solutions, antigen recovering buffers, etc.), solvents (e.g., alcohol, limonene, or the like), or the like. Stains include, without limitation, dyes, hematoxylin stains, eosin stains, conjugates of antibodies or nucleic acids with detectable labels such as haptens, enzymes or fluorescent moieties, or other types of substances for imparting color and/or for enhancing contrast.

A biological specimen can include one or more biological samples. Biological samples can be a tissue sample or samples (e.g., any collection of cells) removed from a subject. The tissue sample can be a collection of interconnected cells that perform a similar function within an organism. A biological sample can also be any solid or fluid sample obtained from, excreted by, or secreted by any living organism, including, without limitation, single-celled organisms, such as bacteria, yeast, protozoans, and amoebas, multicellular organisms (such as plants or animals, including samples from a healthy or apparently healthy human subject or a human patient affected by a condition or disease to be diagnosed or investigated, such as cancer). In some embodiments, a biological sample is mountable on a microscope slide and includes, without limitation, a section of tissue, an organ, a tumor section, a smear, a frozen section, a cytology prep, or cell lines. An incisional biopsy, a core biopsy, an excisional biopsy, a needle aspiration biopsy, a core needle biopsy, a stereotactic biopsy, an open biopsy, or a surgical biopsy can be used to obtain the sample.

Figure 3:
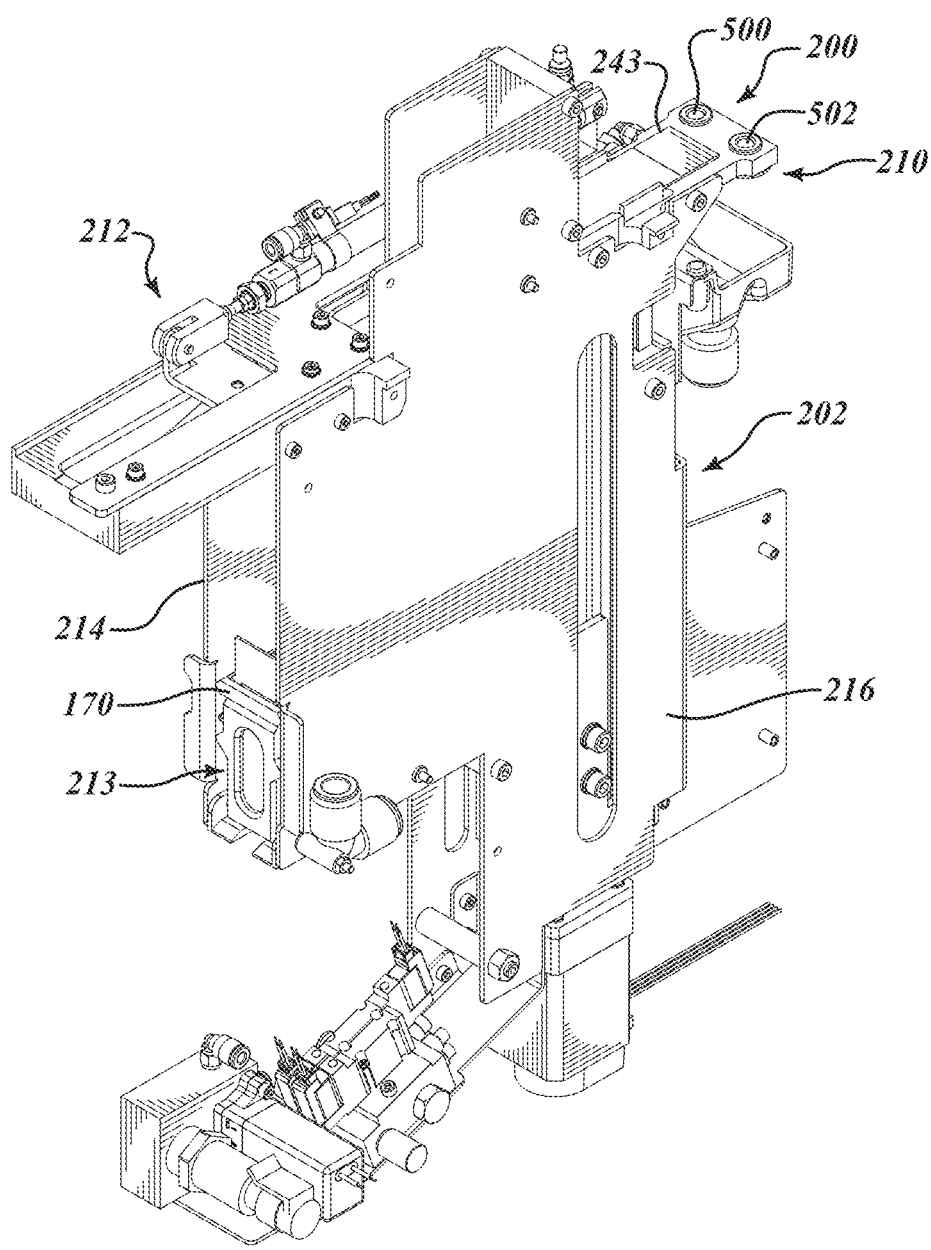
FIG. 3 is an isometric view of a slide ejector assembly in accordance with an embodiment of the disclosed technology.
Figure 4:
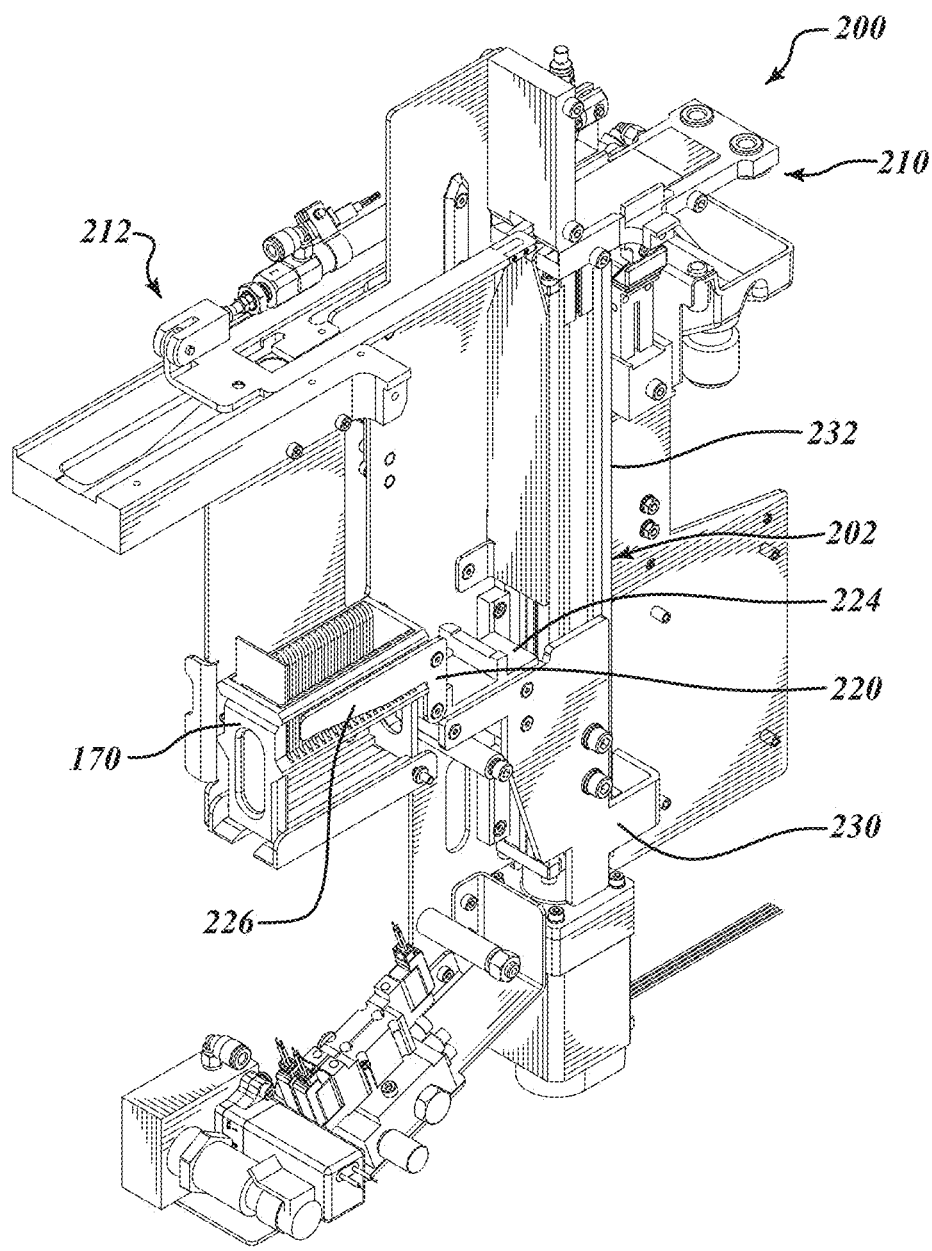
FIG. 4 is an isometric view of the slide ejector assembly of FIG. 3 with protective plates shown removed.

FIGS. 3 and 4 show a slide carrier 170 loaded into a slide ejector assembly 200 ("ejector assembly 200"). A plate 216 of FIG. 3 is shown removed in FIG. 4. The ejector assembly 200 includes a slide carrier handler 202 ("carrier handler 202"), a slide staging device 210 ("staging device 210"), and an ejector 212. The carrier handler 202 can include a carrier receiver 220 (FIG. 4) and a receiver rotator device 224 (FIG. 4). The carrier receiver 220 includes a pair of spaced apart arms 226 (e.g., elongate members, cantilevered members, etc.) upon which the slide carrier 170 can rest. The illustrated slide carrier 170 is a slide rack capable of holding microscope slides in a spaced-apart arrangement. One slide is shown in the carrier 170 of FIGS. 11 and 12. In some embodiments, the slide carrier 170 can be a basket, such as a SAKURA® basket or similar basket with shelves or dividers.

The carrier receiver 220 of FIG. 4 can include one or more grippers, clamps, retainers, or other components that releasably hold slide carriers. The receiver rotator device 224 can include, without limitation, one or more motors, actuation devices, or other components capable of rotating the arms 226. The arms 226 can move along an arcuate track, a pivoting mechanism, or the like to rotate the slide carrier 170. The carrier handler 202 can further include a carriage 230 and a rail 232. The carriage 230 can travel along the rail 232 to move the slide carrier 170 vertically.

Figure 5:
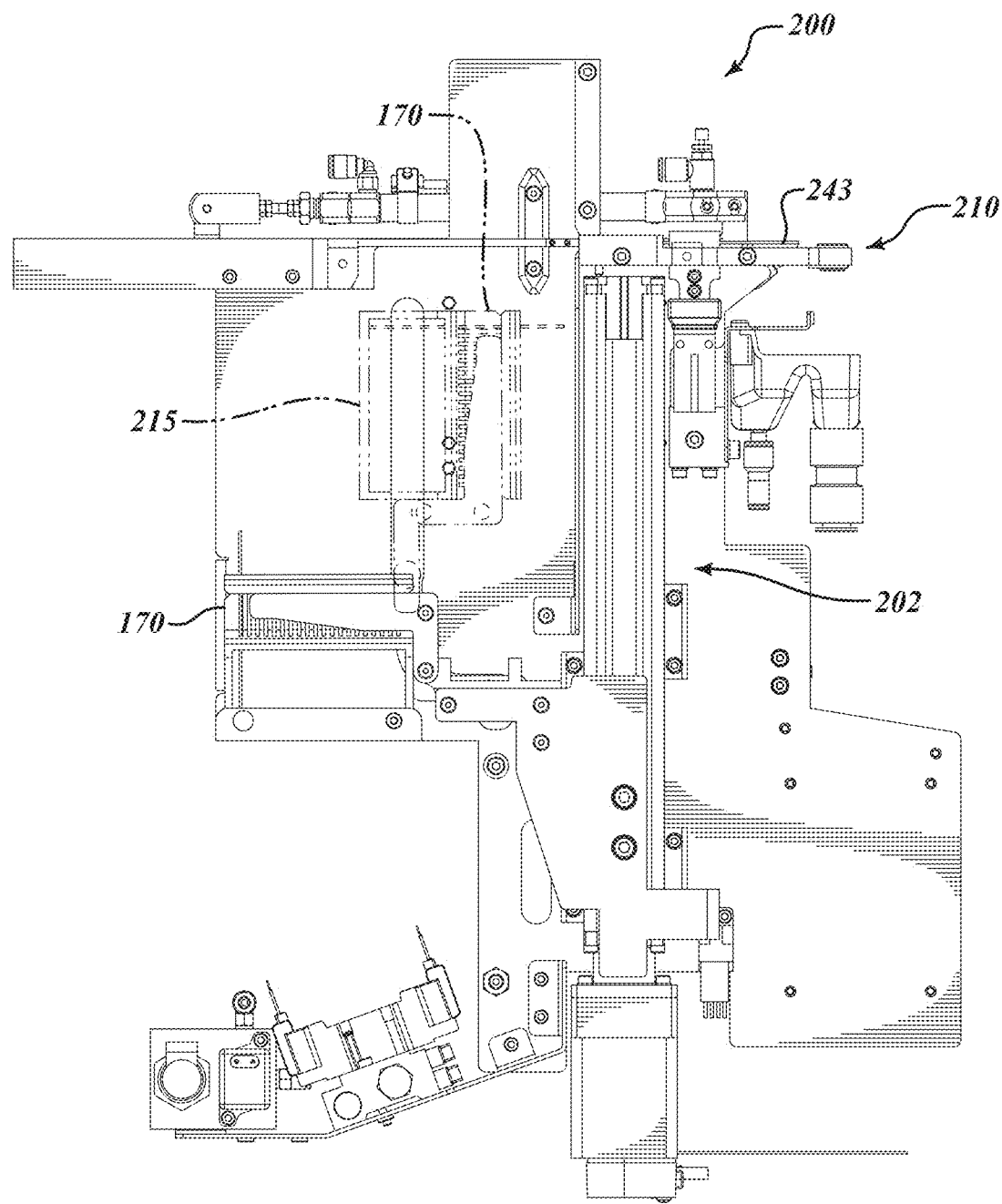
FIGS. 5 and 6 are side views of the slide ejector assembly of FIG. 3 with a slide carrier shown in different vertical positions.
Figure 6:
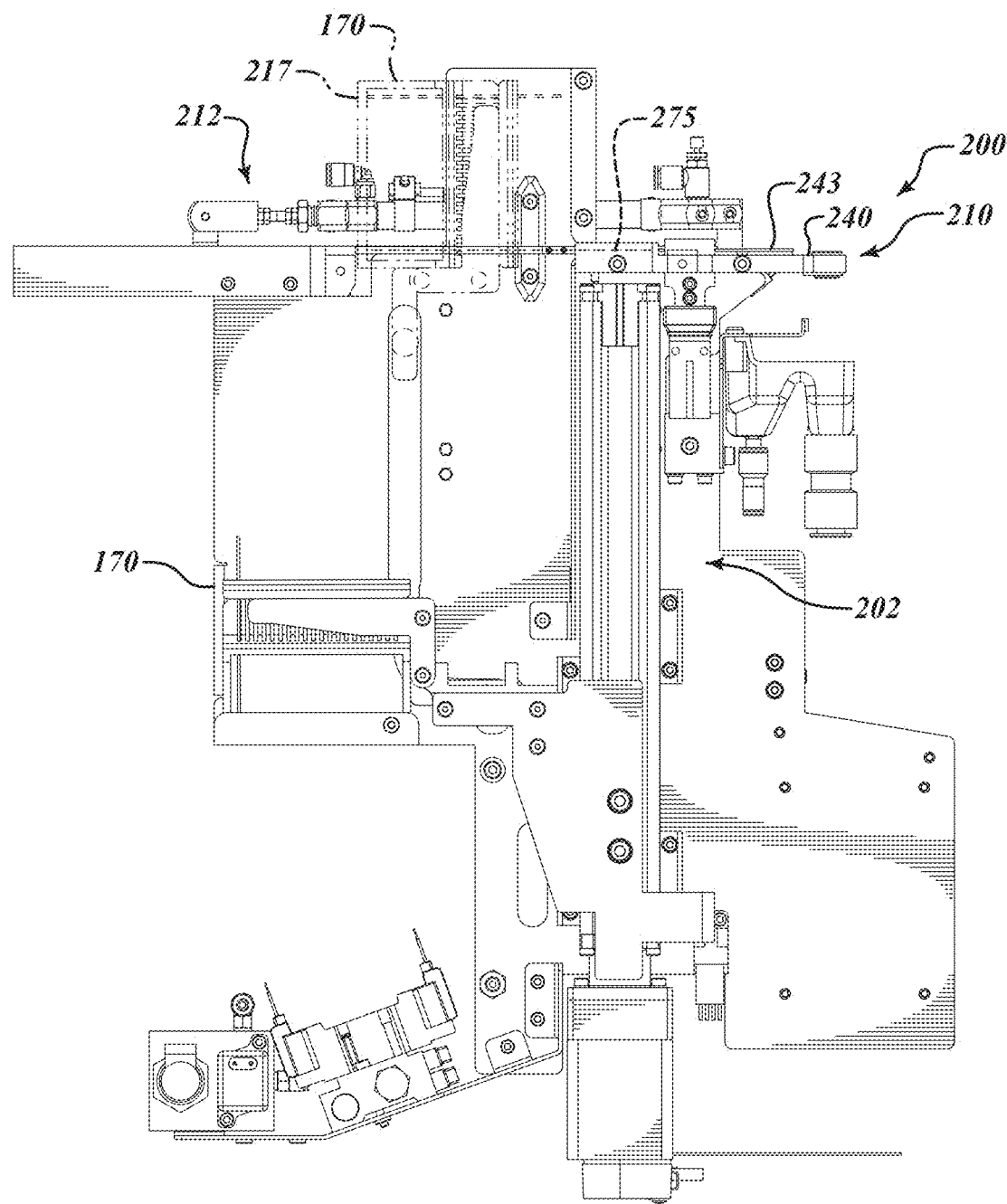

Referring again to FIG. 3, a fully or partially loaded slide carrier can be inserted between the plates 214, 216. The receiver rotator device 224 (FIG. 4) can rotate the carrier receiver 220 from a loading position 213 (FIG. 3) in which slides are held in a substantially vertical orientation to an intermediate position 215 (FIG. 5) in which slides are held in a substantially horizontal orientation. The term "substantially horizontal" generally refers to an angle within about +/−3 degrees of horizontal, for example, within about +/−1 degree of horizontal, such as within about +/−0.8 degrees of horizontal. The slide carrier 170 can be moved vertically to an unloading position 217 (FIG. 6). The ejector 212 can sequentially move the specimen-bearing slides to the staging device 210. The staging device 210 can position the specimen-bearing slide for subsequent transport, as discussed in connection with FIGS. 7-9.

Figure 7:
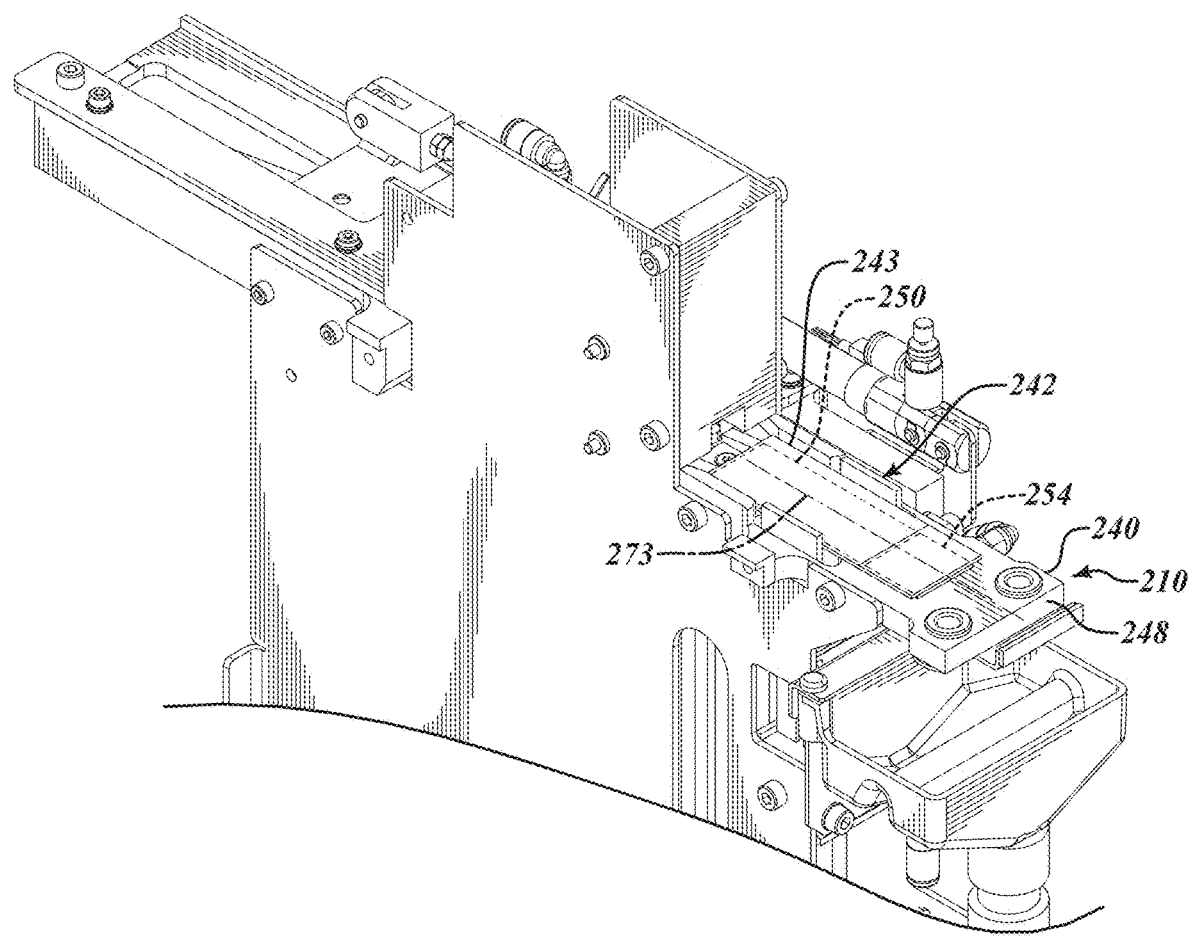
FIG. 7 is an isometric view of a slide staging device of a slide ejector assembly with a slide ready to be removed in accordance with an embodiment of the disclosed technology.
Figure 8:
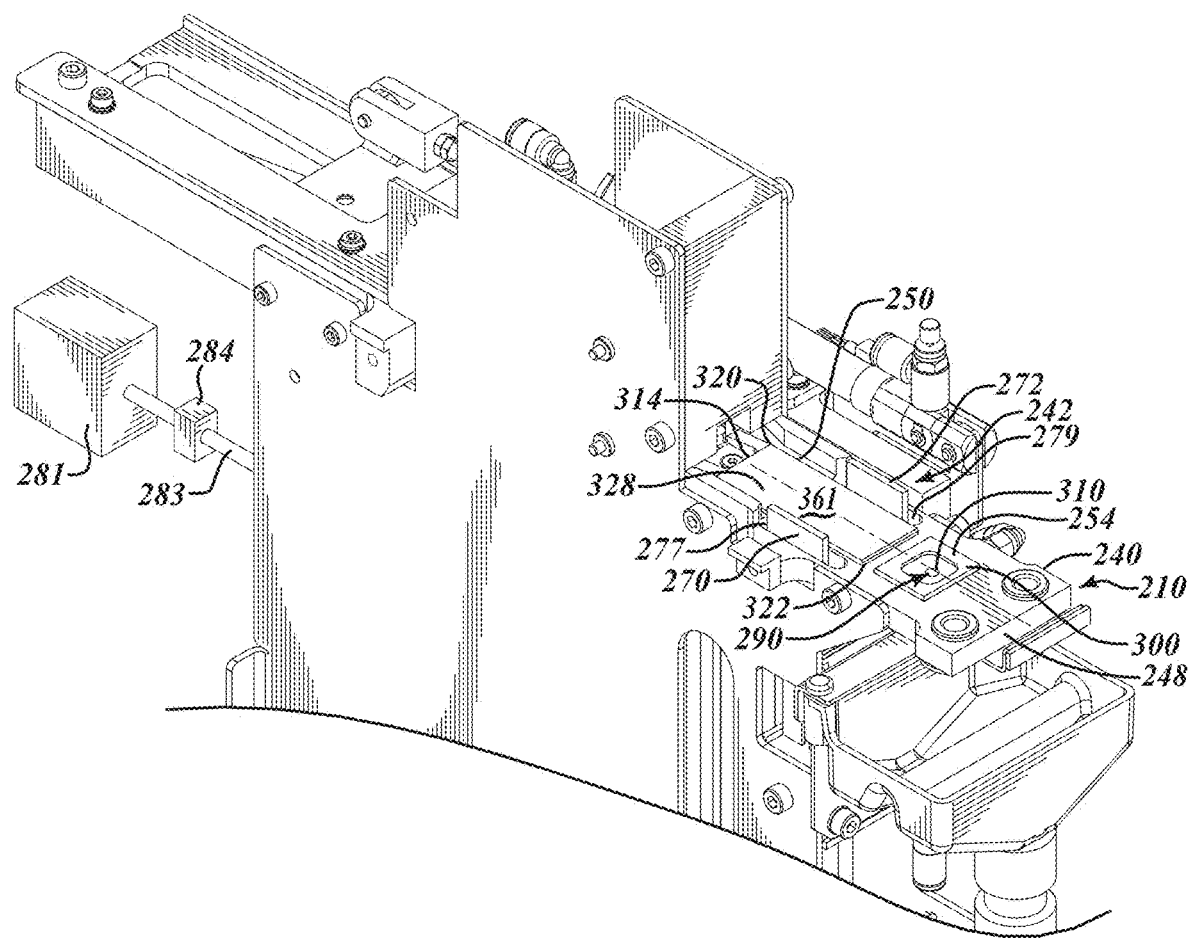
FIG. 8 is an isometric view of an empty slide staging device in accordance with an embodiment of the disclosed technology.

FIGS. 7 and 8 are isometric views of the staging device 210 including a standby platform 240 and an alignment device 242. The standby platform 240 can include a cantilevered plate 248, a slide holding region 250 ("holding region 250"), and an over-travel inhibitor 254. In FIG. 7, a slide 243 is resting on the holding region 250, which can be a raised region that is smaller than the slide 243. The slide 243 can protrude outwardly from the holding region 250 such that excess fluid, if any, can drain from the slide 243 onto the plate 248 without wicking underneath the slide 243 (e.g., between the slide 243 and a surface 361 of FIG. 8). In some embodiments, the standby platform 240 can include, without limitation, one or more sensors, readers, heaters, dryers, or other components that facilitate processing of the slides.

Referring to FIG. 8, the over-travel inhibitor 254 can accurately position a slide without physically contacting specimens on the slide, label edges, and/or other areas of the slide that may affect positioning accuracy. In some embodiments, the over-travel inhibitor 254 can position a slide without contacting the top of the slide at locations, for example, near overhanging labels, which can affect positioning accuracy. The over-travel inhibitor 254 includes a vacuum port 290 and a vacuum source 281 fluidically coupled to the vacuum port 290 via one or more fluid lines 283 (e.g., internal fluid lines, external fluid lines, etc.). The vacuum source 281 can include, without limitation, one or more pressurization devices, pumps, or other types of devices capable of drawing a vacuum via an opening 310. A bottom surface of the slide 243 (FIG. 7) and a contact surface 300 of the vacuum port 290 can form a seal to maintain the vacuum. In some embodiments, the contact surface 300 can comprise one or more compressible materials (e.g., rubber, silicon, or the like) capable of maintaining an airtight seal. In other embodiments, the contact surface 300 can comprise one or more non-compressible materials (e.g., aluminum, stainless steel, etc.) and, in some embodiments, may include one or more sealing members (e.g., O-rings, gaskets, sealing cups, etc.) used to form a seal with the slide 243. In further embodiments and as discussed in more detail below, the contact surface 300 and/or the vacuum port 290 can include a pressure sensor, a vacuum sensor, or other sensor for detecting the presence of a slide 243 on the standby platform 240.

The holding region 250 includes ends 320, 322 and a main body 328 extending between the ends 320, 322. An ejector stop 314 is defined by the end 320 and can be used to reference the position of an end of the slide 243. The ejector stop 314 can be a sidewall or edge of the end 320. In other embodiments, the ejector stop can be one or more protrusions.

Figure 9:
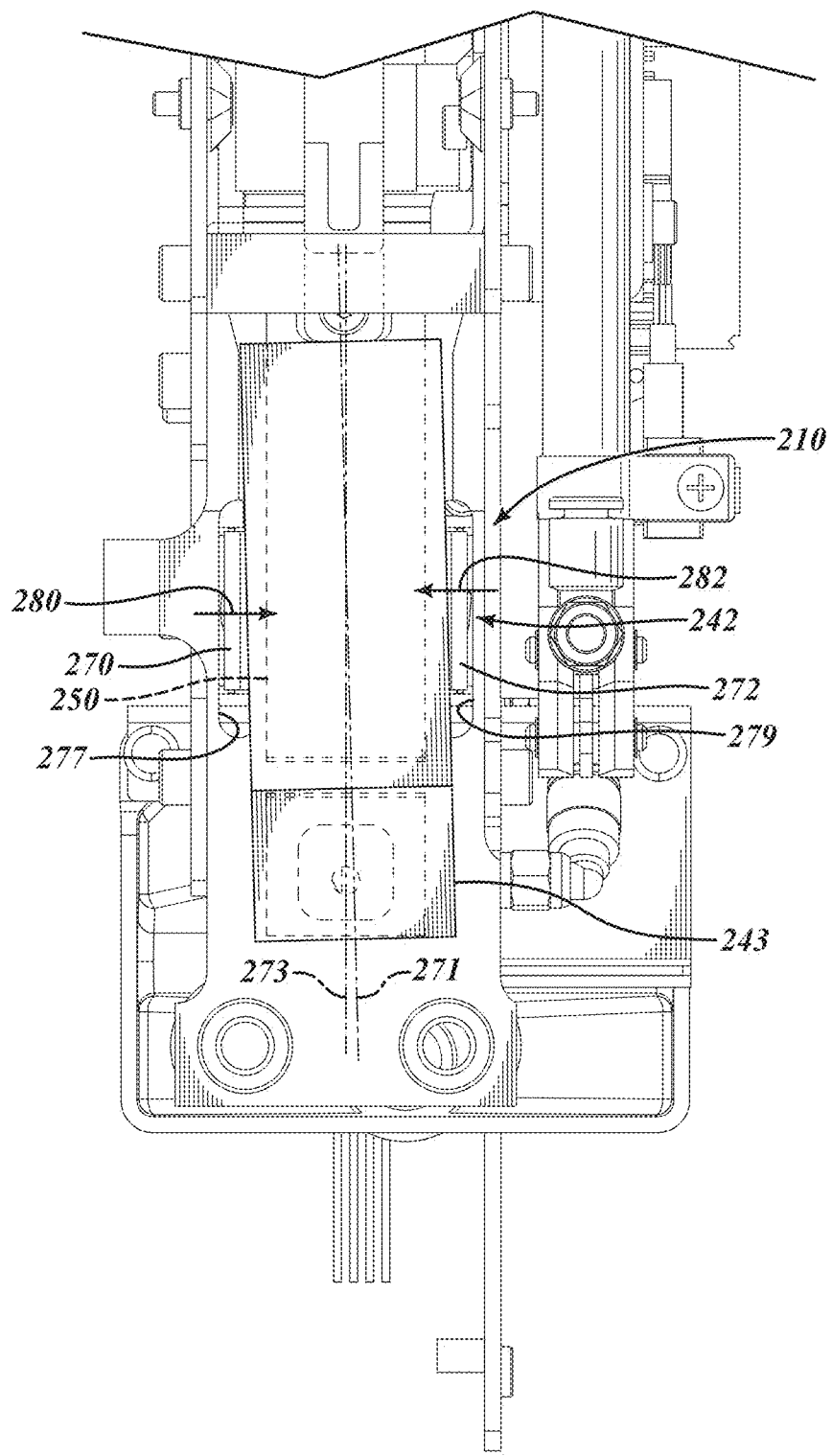
FIGS. 9 and 10 are top plan views of a slide staging device with an alignment device in accordance with an embodiment of the disclosed technology.
Figure 10:
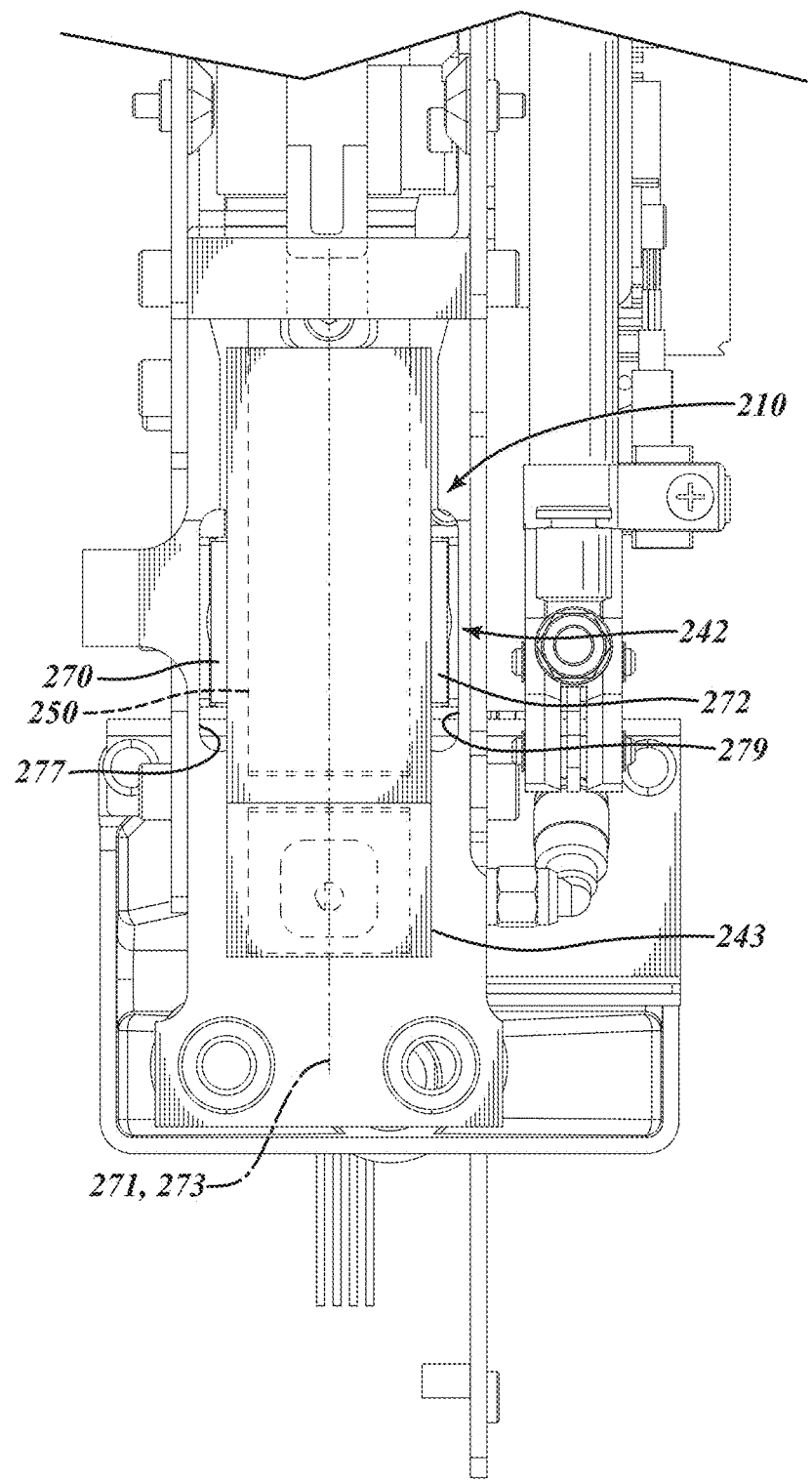

As shown in the embodiment illustrated in FIGS. 8-10, the staging device 210 includes the alignment device 242. In one embodiment, the alignment device 242 includes a pair of generally parallel jaws 270, 272 that protrude upwardly through openings 277, 279, respectively, and vertically past the holding region 250. The alignment device 242 can include, without limitation, one or more actuators (e.g., pneumatic actuators, electromechanical actuators, etc.) capable of moving the jaws 270, 272. The alignment device 242 can align the slide to facilitate slide pickup and handling because a transfer head may be unable to properly pick up and handle a misaligned slide. In some embodiments, a label of the slide can be spaced apart from the jaws 270, 272 to prevent unwanted adherence of the slide to the jaws 270, 272. For example, adhesive (e.g., adhesive that couples the label to the slide), including excessive adhesive surrounding the label, can be kept spaced apart from the jaws 270, 272.

FIG. 9 shows a longitudinal axis 271 of the slide 243 in a misaligned position. The longitudinal axis 271 is not parallel to a longitudinal axis 273 of the holding region 250. The jaws 270, 272 can move from an open position (FIG. 9) toward one another (indicated by arrows 280, 282) to a closed position (FIG. 10) so as to reposition the slide 243. In some embodiments, the longitudinal axis 271 of the slide 243 in an aligned position can be substantially aligned (e.g., parallel) with the longitudinal axis 273 of the holding region 250. After aligning the slide 243, the jaws 270, 272 can be returned to the open position and the slide 243, now aligned, can be picked up. The configuration and operation of the alignment device 242 can be selected based on the desired position of the aligned slide. Additionally, the alignment device 242 can be used to align slides having different dimensions because the jaws 270, 272 apply the same force to opposing sides of the slide.

Figure 11:
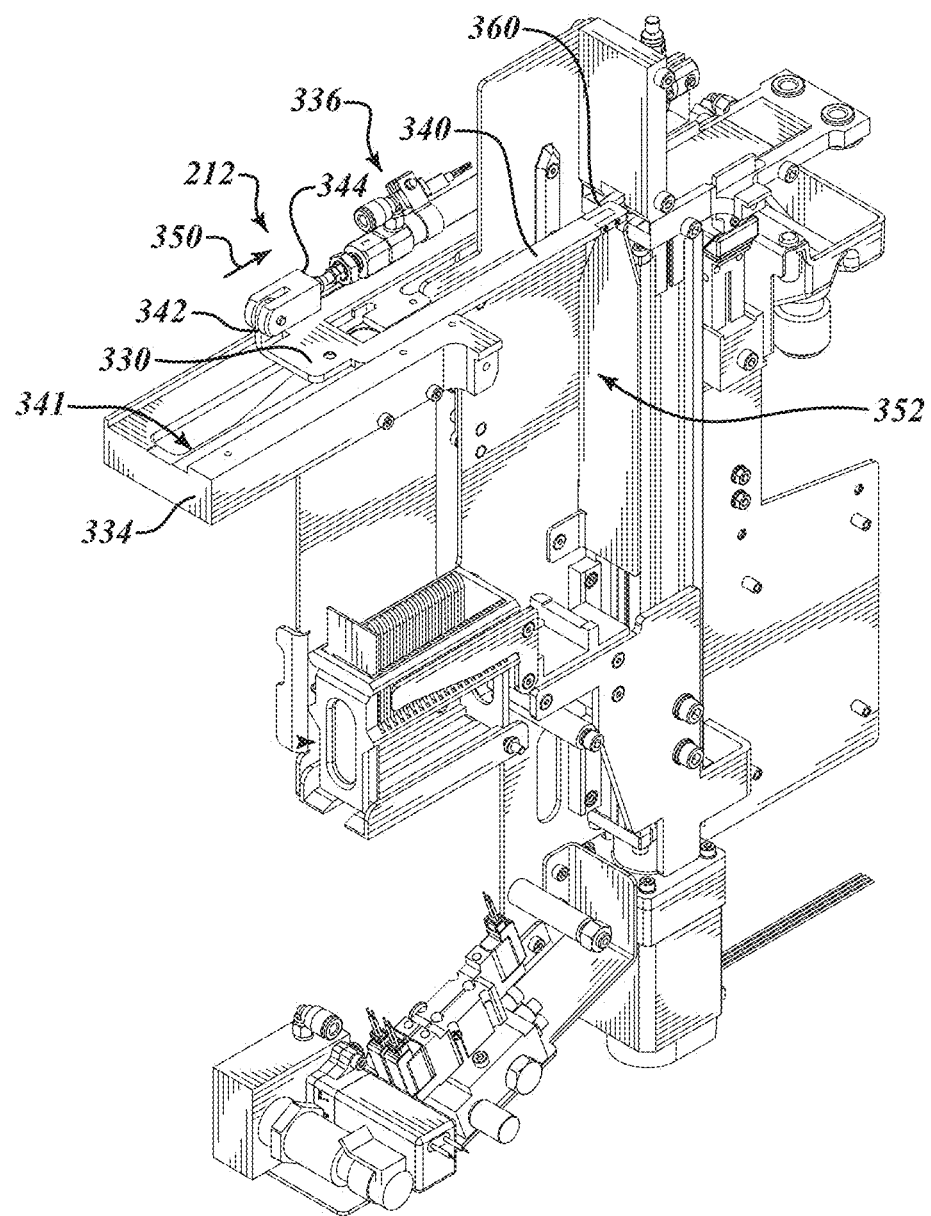
FIGS. 11 and 12 are isometric views of a slide ejector assembly with a protective plate shown removed.
Figure 12:
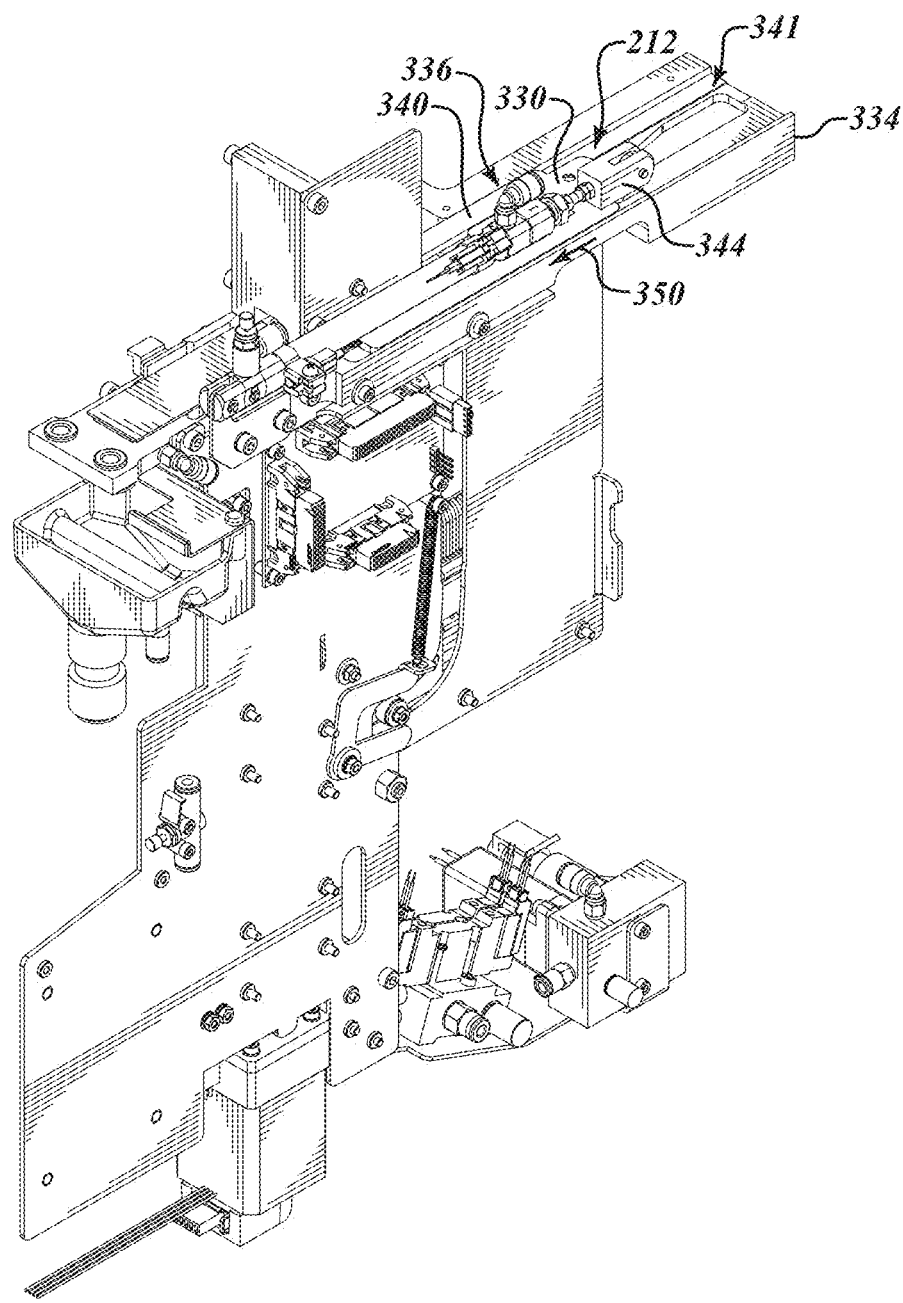
Figure 13:
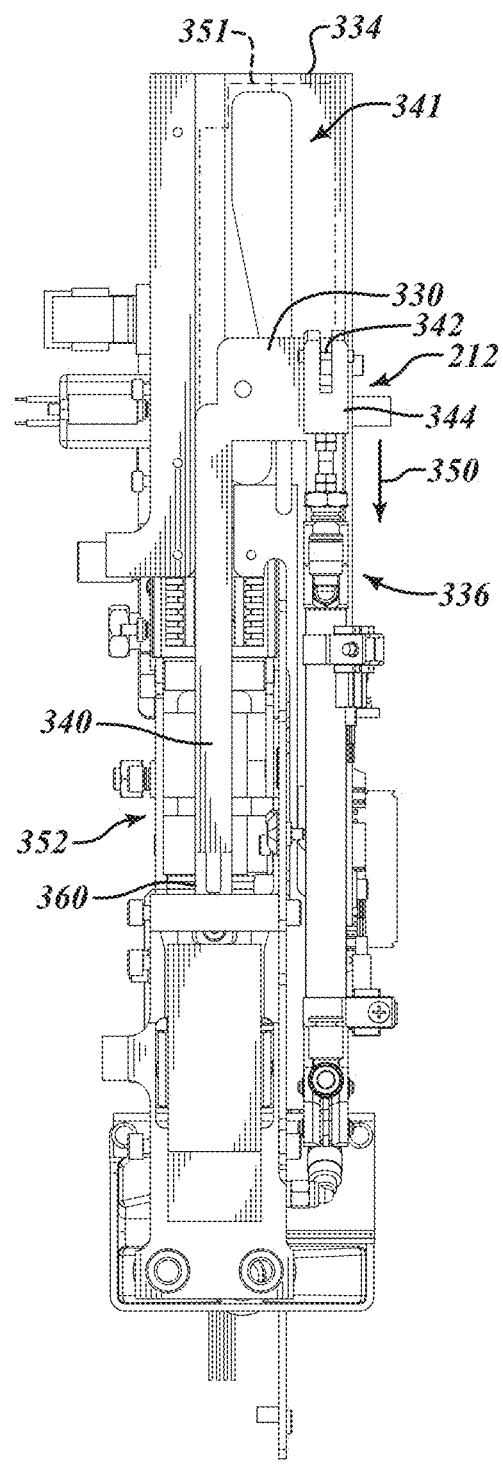
FIG. 13 is a top plan view of the slide ejector assembly of FIGS. 11 and 12.

FIGS. 11-13 show the ejector 212, which includes an ejector element 330, a base 334, and a drive mechanism 336. The ejector element 330 includes an elongate portion 340 positioned in a recess 341 in the base 334 and a mounting portion 342 coupled to a rod 344 of the drive mechanism 336. The drive mechanism 336 can provide reciprocating linear motion and can comprise, without limitation, one or more stopper motors, pistons (e.g., pneumatic pistons, hydraulic pistons, etc.), pressurization devices (e.g., pumps, air compressors, etc.), sensors, or the like. The illustrated rod 344 has been moved in the direction indicated by arrow 350 to move the ejector element 330 from a first or initial position 351 (illustrated in phantom line in FIG. 21) across a slide carrier receiving gap 352 ("gap 352") such that a head 360 of the elongate portion 340 pushes a slide onto the standby platform 240. The head 360 can comprise a compliant material (e.g., rubber, plastic, etc.) to avoid damaging the slides. In some embodiments, the head 360 can push the slide along the surface 361 (FIG. 8) of the holding region 250 until the slide is at the desired location. Slides can be removed from the slide carrier 170 one at a time until the slide carrier 170 is empty.

Referring again to FIG. 1A, a user can load a slide carrier holding specimen-bearing slides into the parking station 124 or 148. A transfer mechanism can transport the slide carrier to the ejector assembly 200. The transfer mechanism can include, without limitation, one or more robotic handlers or arms, X-Y-Z transport systems, conveyors, or other automated mechanisms capable of carrying items between locations. In some embodiments, the transfer mechanism includes one or more end effectors, grippers, suction devices, holders, clamps, or other components suitable for gripping the slide carrier.

Figure 19:
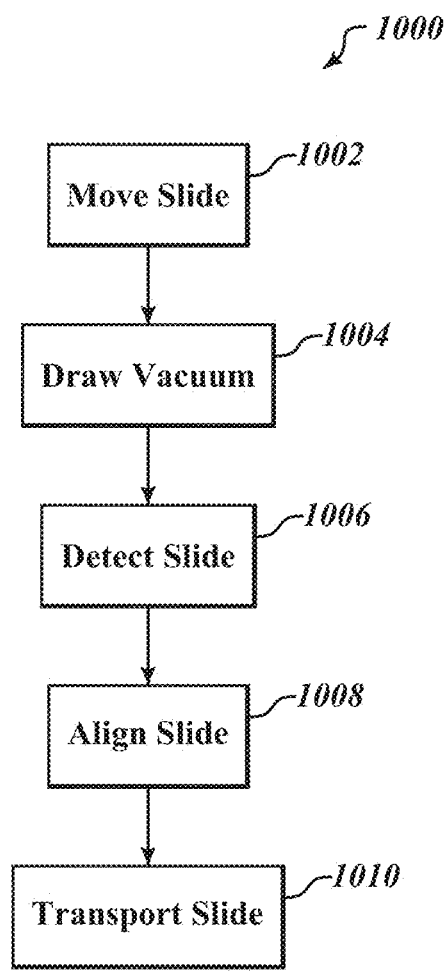
FIG. 19 is a block diagram illustrating a method for transferring a specimen slide using the specimen processing system in accordance with an embodiment of the disclosed technology.

The ejector assembly 200 moves the slide carrier 170 to the unloading position 217 (FIG. 6). The slide carrier 170 is moved vertically to index slides relative to a reference position. The reference position can be a plane (e.g., a fixed slide removal plane 275 shown in FIG. 6) defining a slide removal position. A bottom of the slide to be removed can be generally coplanar or slightly above the surface 361 (FIG. 8). The drive mechanism 336 can move the ejector element 330 horizontally to move the elongate portion 340 (FIG. 19) through the carrier 170 to push the slide onto the surface 361 (FIG. 8). A vacuum can be drawn by the slide over-travel inhibitor 254 to inhibit movement of the slide 243 as the head 360 contacts the ejector stop 314 (FIG. 8). In some embodiments a sensor 284, such as a vacuum sensor, can be present along a vacuum fluid line 283 and/or associated with the over-travel inhibitor 254 to positively detect the presence of the slide 243. The head 360 can then be moved away from the slide 243. The jaws 270, 272 can be moved from the open position to the closed position to align the slide 243. The aligned slide 243 can be retrieved and transported to a specimen processing station. The drive mechanism 336 can move the ejector element 330 back and forth and the slides can be indexed to sequentially deliver all of the slides to the staging device 210.

To protect the specimens, the lowermost slide in the slide carrier 170 can be ejected first. By starting with the lowermost slide, the specimen(s) on the vertically adjacent slide can be facing away from the head 360 and therefore protected. If the head 360 is vertically misaligned with the slide to be removed, the head 360 may strike the bottom of the vertically adjacent slide without dislodging the specimen(s) on the upper surface of the vertically adjacent slide. After removing the lowermost slide, the lowermost slide left in the slide carrier 170 can be removed. This process can be repeated until the slide carrier 170 is empty. Other indexing sequences can be used to remove the slides.

The empty slide carrier 170 can be returned to the loading position (FIG. 3) and then transported to one of the bays of the parking station 124 or 148. The empty slide carrier 170 can be removed from the parking station 124 or 148 and filled with specimen-bearing slides and returned to the parking station 124 or 148. Alternatively, the empty slide carrier 170 can be filled with processed specimen-bearing slides using the ejector assembly 200. A pusher assembly can be used to push processed specimen-bearing slides on the staging device 210 into a slide carrier. Thus, the ejector assembly 200 can be used to both unload and load slide carriers.

Figure 14:
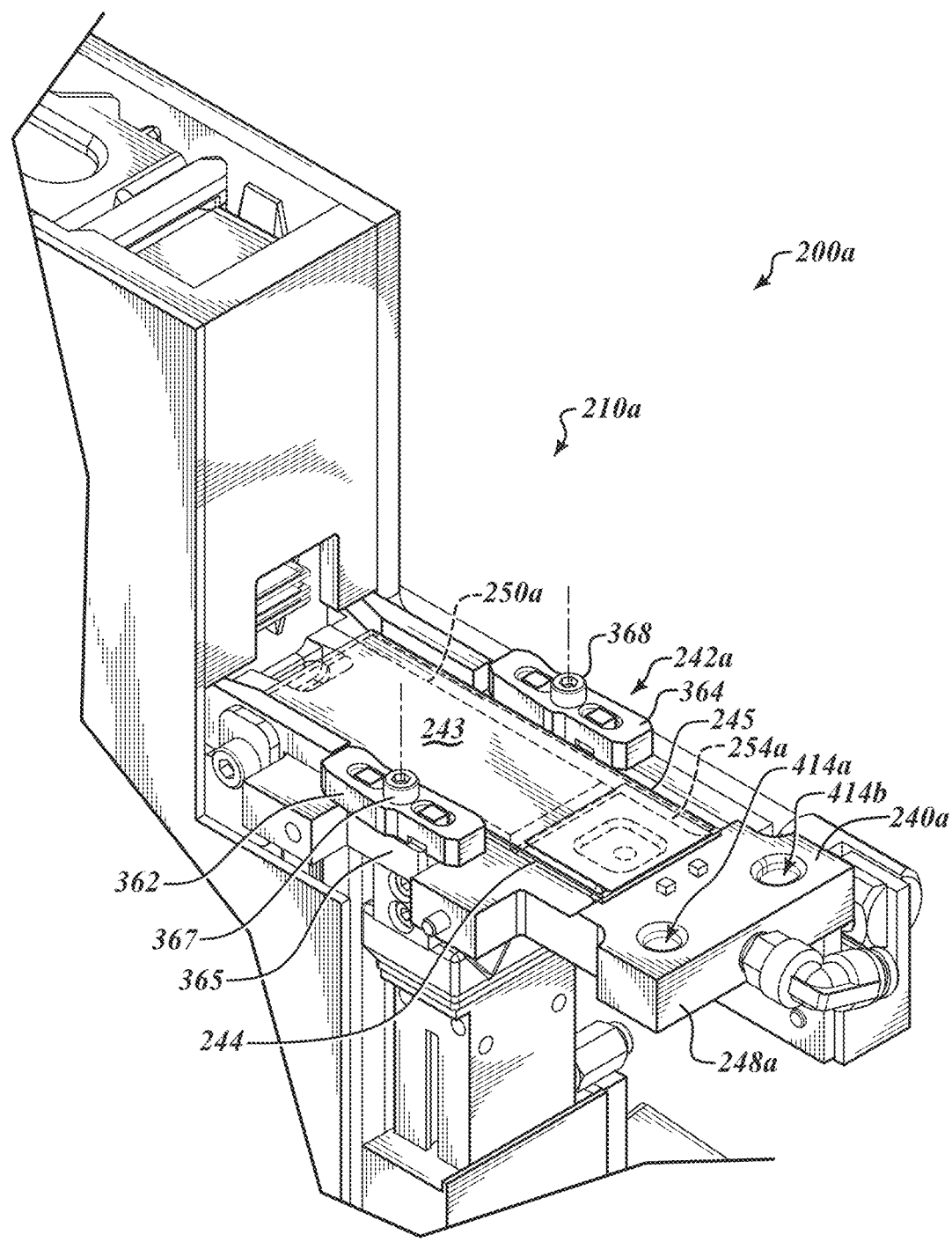
FIG. 14 is an isometric view of a slide staging device of a slide ejector assembly with a slide ready to be removed in accordance with another embodiment of the disclosed technology.
Figure 15:
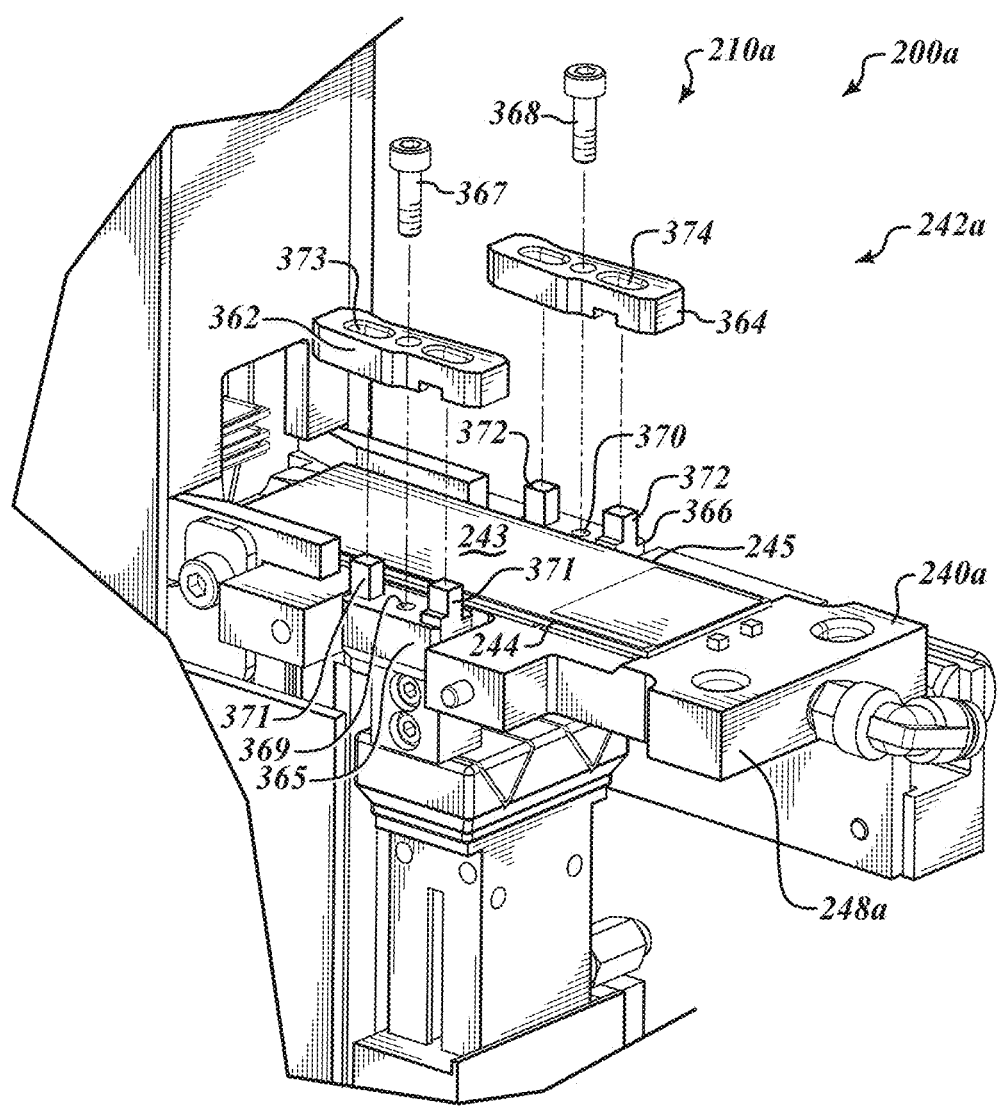
FIG. 15 is an isometric view of the slide staging device of FIG. 14 illustrating components of an alignment device in accordance with an embodiment of the disclosed technology.

FIGS. 14-18 illustrate a staging device 210a of a slide ejector assembly 200a configured in accordance with an additional embodiment of the present technology. FIGS. 14 and 15 are isometric views of the staging device 210a that includes features generally similar to the features of the staging device 210 described above with reference to FIGS. 8-10. For example, the staging device 210a includes a standby platform 240a (similar to standby platform 240 shown in FIG. 8) having a cantilevered plate 248a, a slide holding region 250a ("holding region 250a"), and an over-travel inhibitor 254a (similar to over-travel inhibitor 254 shown in FIG. 8). The staging device 210a also includes an alignment device 242a configured to move the slide 243 from a misaligned position on the standby platform 240a to an aligned position. However, in the embodiment shown in FIGS. 14 and 15, the alignment device 242a does not include a pair of generally parallel jaws 270, 272 (FIG. 8) that protrude upwardly through openings 277, 279 (FIG. 8) in the standby platform 240a.

In the embodiment illustrated in FIG. 14, the alignment device 242a includes a first aligning member 362 for engaging a first edge 244 of the slide 243 and a second aligning member 364 positioned opposite the first aligning member 362 for engaging a second edge 245 of the slide 243. Engagement of the first and second sides 244, 245 of the slide 243 can pivot or otherwise move the slide 243 from an unaligned orientation on the slide holding region 250a to an aligned orientation on the holding region 250a to facilitate slide pickup and handling by a transfer apparatus (not shown).

Referring to FIG. 15, the first and second aligning members 362, 364 are secured to blocks 365, 366 by first and second fasteners 367, 368 (e.g., pins, bolts, screws or other mechanical fasteners known to those in the art). For example, the blocks 365, 366 can include holes 369, 370 for receiving the fasteners 367, 368, respectively. The blocks 365, 366 can further include one or more protrusions 371, 372 for allowing rotation or pivoting of the aligning members 362, 364 and for engaging the first and second aligning members 362, 364, respectively, to limit rotation or pivoting of the aligning members 362, 364 with respect to the blocks 365, 366 and/or during engagement with the slide 243 (described below). Openings 373, 374 (one identified) can be disposed in the aligning members 362, 364 for receiving the protrusions 371, 372. In other embodiments, protrusions may be provided on the aligning members 362, 364 that are receivable in openings provided in the blocks 365, 366. In some embodiments, the protrusions 371, 372 may be non-circular having a rectangular or other geometrical shape. The openings 373, 374 can be shaped to accommodate the corresponding geometrical shape of the protrusions 371, 372, or as illustrated in FIG. 15, the openings 373, 374 can be through-holes that receive the protrusions 371, 372.

Figure 16A:
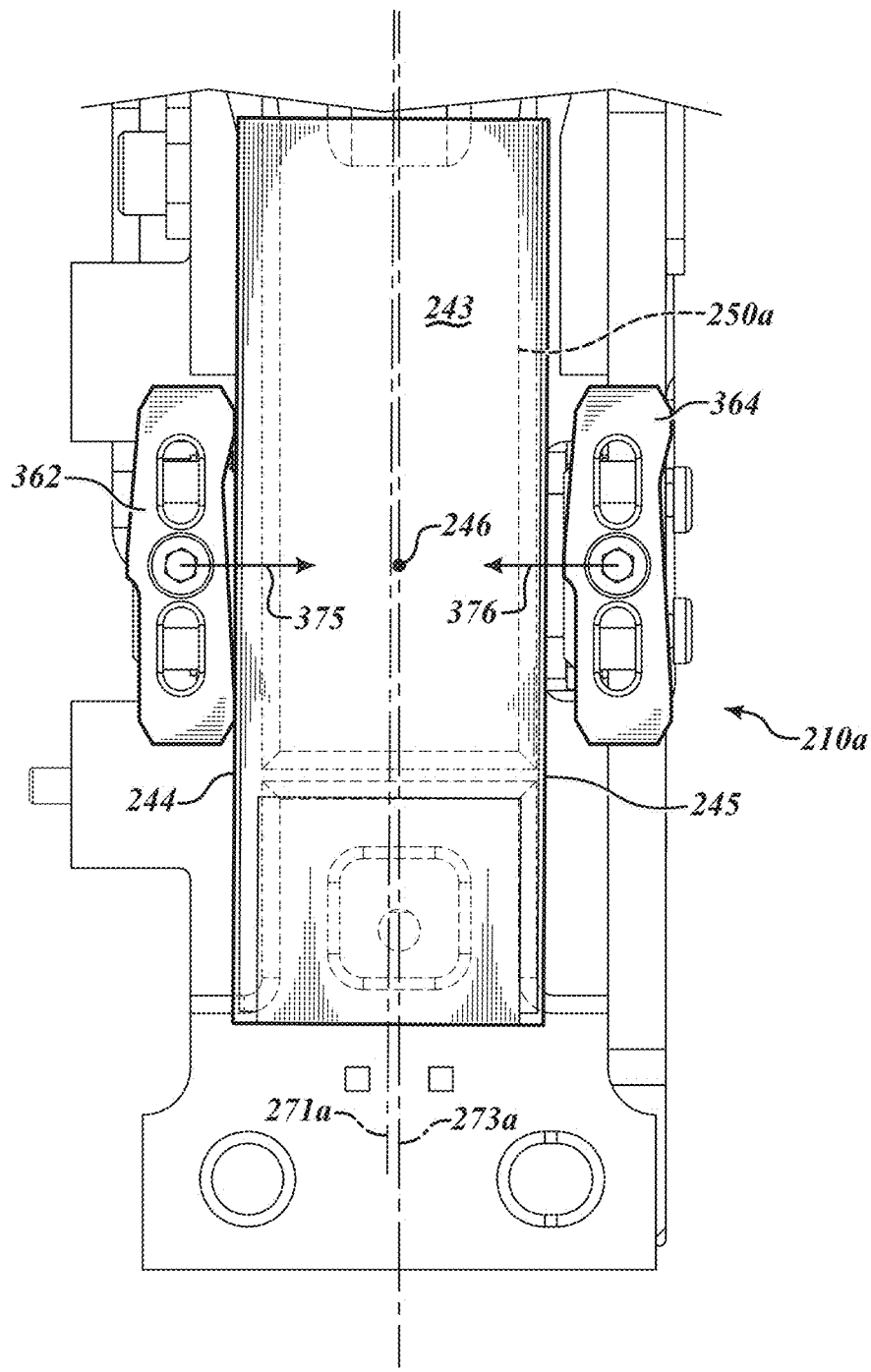
FIGS. 16A and 16B are top plan views of a slide staging device with an alignment device in accordance with an embodiment of the disclosed technology.
Figure 16B:
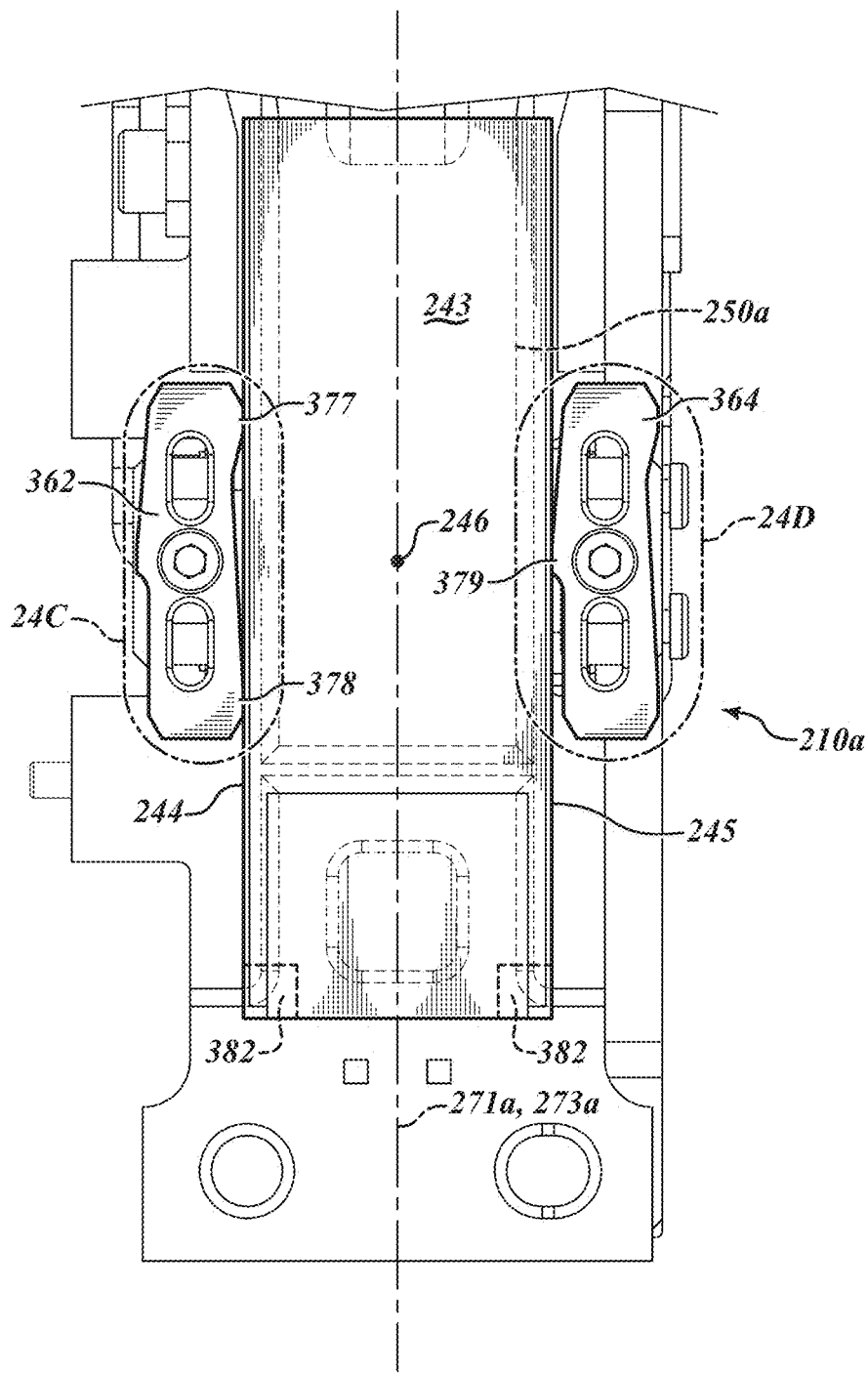
Figure 16C:
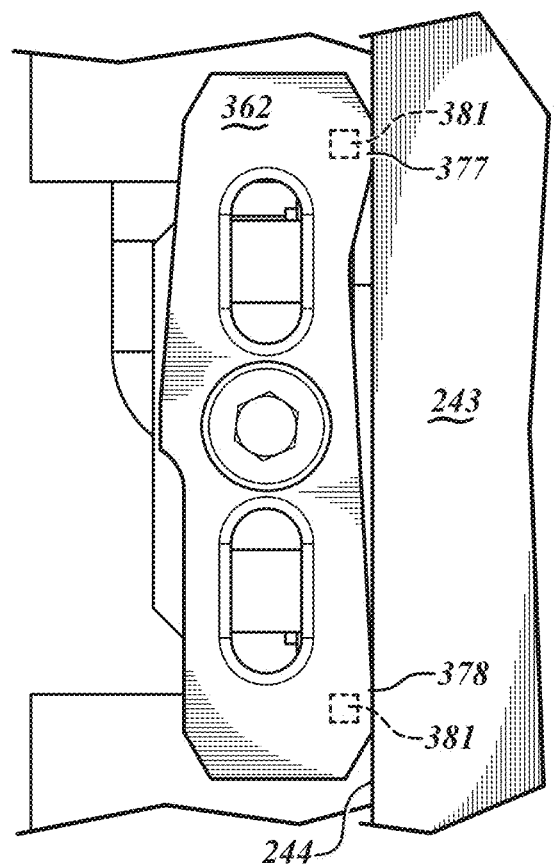
FIGS. 16C and 16D are enlarged views of the alignment device of FIG. 16B.

The alignment device 242a can include, without limitation, one or more actuators (e.g., pneumatic actuators, electromechanical actuators, etc.) capable of moving the blocks 365, 366 having the aligning members 362, 364 secured thereto toward and away from a longitudinal axis 273a of the holding region 250a (shown in FIGS. 16A and 16B). For example, FIGS. 16A and 16B are enlarged top views of the staging device 210a illustrating stages in a process for aligning a longitudinal axis 271a of the slide 243 with the longitudinal axis of 273a of the holding region 250a. FIG. 16A shows the longitudinal axis 271a of the slide 243 in a misaligned position. The longitudinal axis 271a is not parallel to the longitudinal axis 273a of the holding region 250a. The first and second aligning members 362, 364 can move from an open position (FIG. 16A) toward one another (indicated by arrows 375, 376) to a closed position (FIG. 16B) where the aligning members 362, 364 engage or come in contact with the first and second sides 244, 245 of the slide 243 to reposition the slide.

Figure 16D:
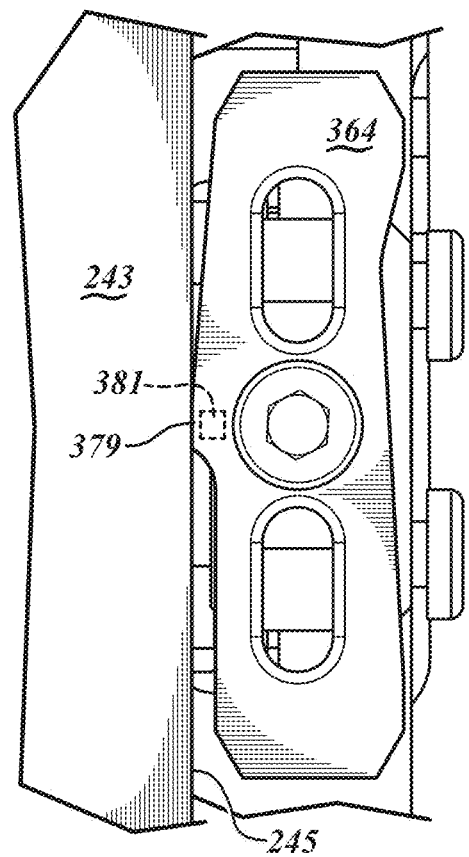

In one embodiment, the first and second aligning members 362, 364 together contact the slide 243 at three separate points of contact. In the embodiment illustrated in FIGS. 16B and 16C, the first aligning member 362 has a first contact region 377 and a second contact region 378 configured to engage the first edge 244 of the slide 243. As illustrated in FIGS. 16B and 16D, the second aligning member 364 has a third contact region 379 configured to engage the second edge 245 of the slide 243. In one embodiment, the area of the point of contact is the portion of the slide 243 engaged by the first, second and third contact regions 377, 378, 379. In some arrangements, the points of contact are relatively small, discrete portions of the slide 243 (e.g., along the first and second edges 244, 245). In some embodiments, the surface areas defined by the three points of contact and engaged by the first, second and third contact regions 377, 378, 379 are approximately the same; however, in other embodiments, the surface areas can vary. In one embodiment, the third contact region 379 is configured to contact the second edge 245 of the slide 243 in a lateral position along the slide 243 that is between the lateral positions contacted by the first contact region 377 and second contact region 378 on the first edge 244 of the slide 243.

Referring to FIG. 16B, when the first and second contact regions 377, 378 of the first aligning member 362 and the third contact region 379 of the second aligning member 364 engage the first and second sides 244, 245 of the slide 243, respectively, the slide 243 can move (e.g., pivot about a midpoint or axis of rotation 246 created or defined by the three separate contact points) to an aligned position. Movement of the first and second alignment members 362, 364 via blocks 365, 366 can continue until the slide 243 is engaged by the first, second and third contact regions 377, 378 and 379 and the slide 243 no longer moves (e.g., comes to rest on the holding region 250a in an aligned position). In some embodiments, the first and second aligning members 362, 364 may include one or more pressure sensors 381 (FIGS. 16C and 16D) on or adjacent to one or more contact regions 377, 378, 379 to ensure that the aligning members 362, 364 are applying a sufficient amount of force to move the slide 243 and/or are not compressing the slide 243 in a manner that could break or compromise the slide. In some embodiments, the contact regions 377, 378, 379 may include a coating and/or a compliant material (e.g., rubber, plastic, etc.) to avoid damaging the slides.

While FIGS. 16A-16D show the first aligning member 362 having the first contact region 377 and the second contact region 378 and the second aligning member 364 having the third contact region 379, or other arrangements can be used. For example, the second aligning member 364 can include two contact regions and the first aligning member 362 may include one contact region. Further, while the aligning members 362, 364 are illustrated as having an irregular shaped geometry for providing first, second and third contact regions 377, 378, 379, other geometries may be suitable for providing first, second and third contact regions. In other embodiments, the aligning members 362, 364 may provide more than three separate (e.g., discrete) contact regions for engaging the slide 243.

Referring back to FIG. 16B, the longitudinal axis 271a of the slide 243 in an aligned position can be substantially aligned (e.g., parallel) with the longitudinal axis 273a of the holding region 250a. After aligning the slide 243, the aligning members 362, 364 can disengage the slide 243 and be returned to the open position by moving the blocks 365, 366 in a direction opposite to the direction of the arrows 375, 376 (FIG. 16A). Optionally, the staging device 210a may include sensors 382 or other signaling device for determining the presence of the slide 243 on the standby platform 240a and/or determining when the longitudinal axis 271a is substantially aligned with the longitudinal axis 273a (FIG. 16B). For example, the standby platform 240a and/or the holding region 250a may include position sensors, pressure sensors, light sensors and the like for determining the relative position of the slide 243 with respect to the holding region 250a. Similar to the configuration and operation of the alignment device 242 (FIGS. 8-10), the alignment device 242a can be configured to align slides having different dimensions and align them to a desired position on the standby platform 240a.

Figure 17:
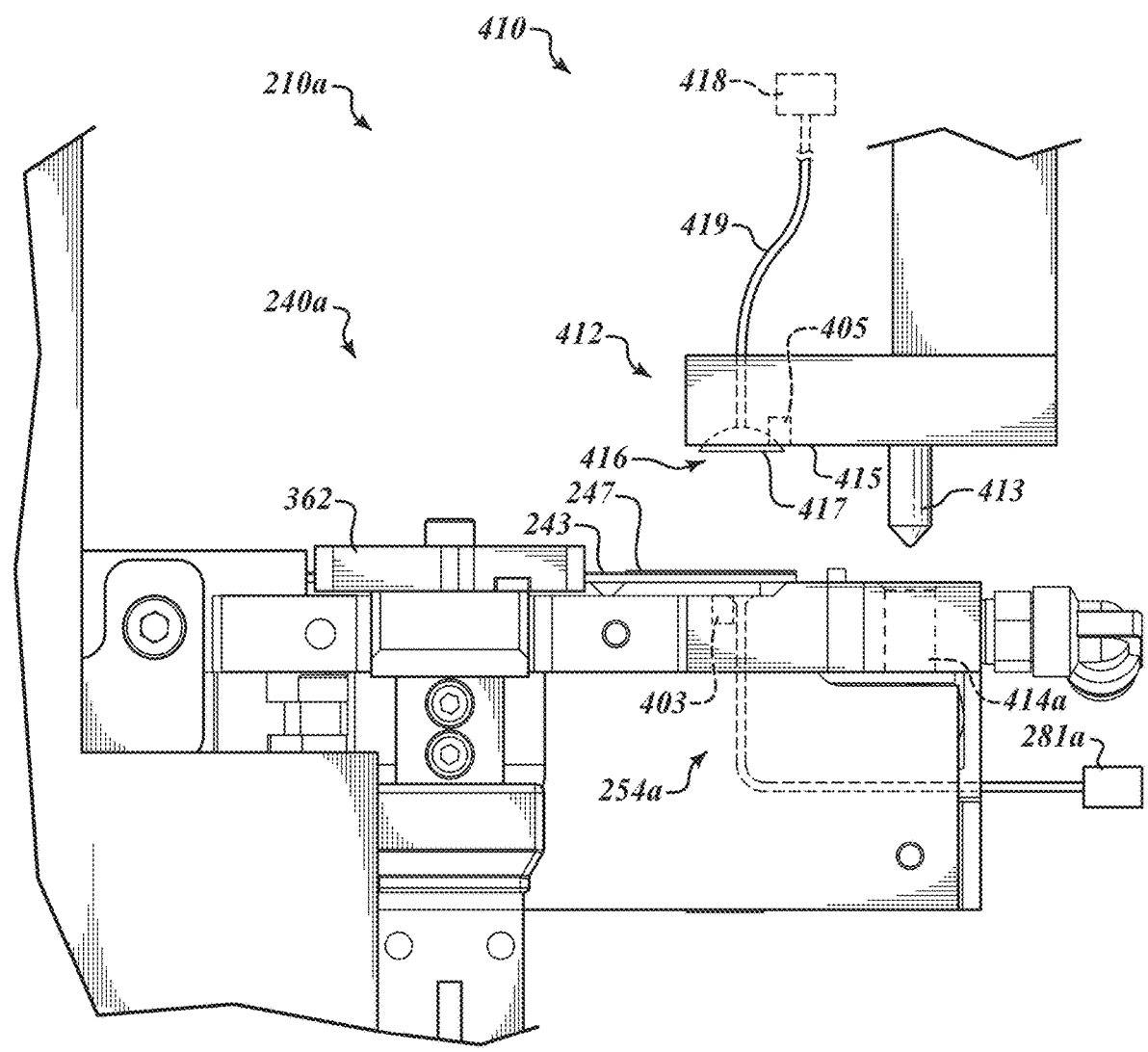
FIGS. 17 and 18 are side views of a slide staging device and a transfer assembly in accordance with an embodiment of the disclosed technology.
Figure 18:
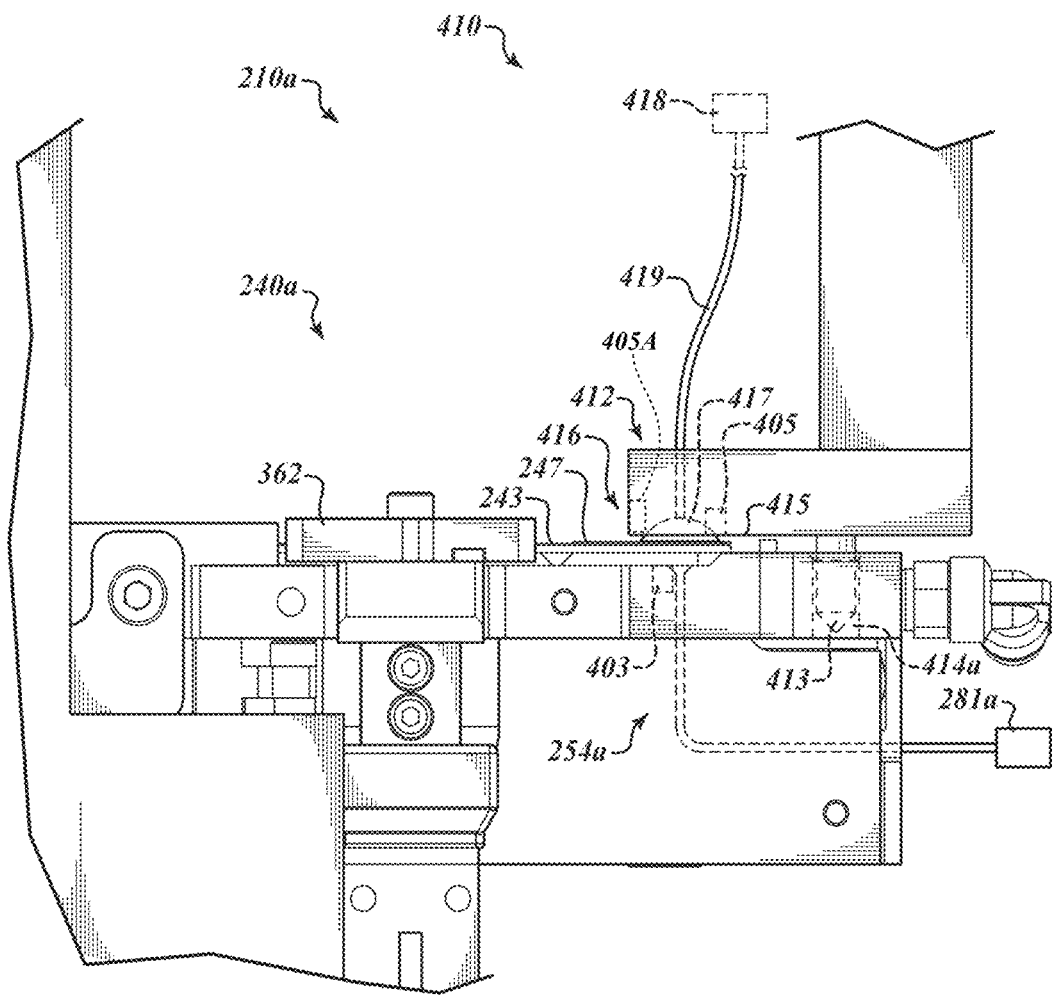

After aligning the slide 243, the slide can be retrieved and transported to a specimen processing station (not shown). FIGS. 17 and 18 illustrate a portion of a transfer assembly 410 having a slide transfer head 412 ("transfer head 412") configured to pick up the aligned slide 243 from the standby platform 240a while maintaining the proper alignment. Referring to FIG. 17, the transfer head 412 includes a plurality of head alignment features 413 (e.g., 2 head alignment features) on a lower surface 415 of the transfer head 412. Head alignment features 413 can include, without limitation, pins (e.g., elongate rods), protrusions, openings (e.g., openings defined by bushings, openings in plates, etc.), or the like. In some embodiments, the head alignment features 413 can be in the form of alignment pins (e.g., first and second alignment pins) that can be inserted into corresponding alignment features 414 (shown individually as 414a and 414b) on the staging device 210a (e.g., on cantilevered plate 248a), illustrated in FIGS. 22 and 25. In other embodiments, the head alignment features 413 are openings and the corresponding alignment features 414 are upwardly protruding pins. In some embodiments, the transfer head 412 can be a floating head (e.g., a floating head is an alignment head that does not contact the staging device 210a while the alignment features 413 may) to limit or prevent binding between the head alignment features 413 and the corresponding alignment features 414. In some embodiments, the transfer head 412 and/or the staging device 210a can include position sensors (405A) to ensure proper alignment of the head alignment features 413 with respect to the corresponding alignment features 414.

The transfer head 412 can also include one or more capture features 416. The capture feature 416 can include, without limitation, one or more suction devices (e.g., suction cups, pumps, vacuum pumps, etc.), mechanical grippers (e.g., jaws, clamps, pinchers, magnets, etc.), or other retention features that, for example, prevent dropping and/or transferring the slide 243 in a misaligned state. For example, the transfer head 412 can include a vacuum port 417 on the lower surface 415. A vacuum source 418 can provide suction at the vacuum port 417 via supply line 419 that is capable of picking up the slide 243 from the staging device 210a and holding the slide during further transport. The vacuum provided by vacuum source 418 can be reduced and/or eliminated to release the slide 243 following transfer. Sensors 405 (e.g., pressure sensors, air pressure sensors, light sensors, etc.) can be provided on the lower surface 415 and/or within the vacuum port 417, the vacuum source 418 and/or the supply line 419 that detect the presence of a slide 243 retained by the transfer head 412. In some embodiments, the controller 144 (FIG. 1A) can detect changes in pressure associated with the vacuum source 418 and/or vacuum port 417 via the sensor 405 and detect changes in pressure associated with the vacuum source 281 and/or vacuum port 290 (FIG. 8) via the sensor 403 associated with the over-travel inhibitor 254a. In one embodiment, vacuum pressure at the over traveler inhibitor 254a can be reduced by the controller when the sensor 405 indicates positive detection (and increased pressure) of the slide 243 at the vacuum port 417 on the transfer head 412.

In one embodiment, the sensor 405 can be a vacuum sensor that can sense and confirm slide engagement with the transfer head 412. For example, a vacuum sensor gauge can be pre-calibrated to a baseline pressure and further calibrated to sense an increase in vacuum pressure when a slide 243 is engaged. Confirmation of slide engagement by the sensor 405 can cause further programming instruction in the controller 144 (FIG. 1A) to continue with a next step of transporting the slide 243.

FIG. 17 shows the transfer head 412 in a non-engaged position above the staging device 210a during an alignment phase of the slide transfer. The head alignment feature 413 is shown aligned with the corresponding alignment feature 414a. FIG. 18 shows the transfer head 412 lowered (e.g., via a drive mechanism, not shown) in an engaged position above the staging device 210a. The head alignment feature 413 (e.g., pin) is shown received within the opening of the corresponding alignment feature 414a. The vacuum port 417 is shown engaged with an upper surface 247 of the slide 243 (e.g., a label of the slide 243) such that when the vacuum source 418 is activated (e.g., by controller 144 of FIGS. 1 and 1A) and the over-travel inhibitor 254a associated with standby platform 240a is disengaged (e.g., vacuum provided by stage vacuum source 281a is reduced and/or eliminated), the slide 243 can be picked up by the transfer head 412. The slide 243 can be removed from the staging device 210a as the transfer head 412 is lifted to the non-engaged position above the staging device 210a. As illustrated in FIG. 18, the head alignment features 413 align with the corresponding alignment features 414 such that the slide 243 can be maintained in the aligned position during slide pickup. After removing the slide 243 from the staging device 210a, the transfer head 414 can transport the slide 243 to the specimen processing station (not shown).

Figure 18A:
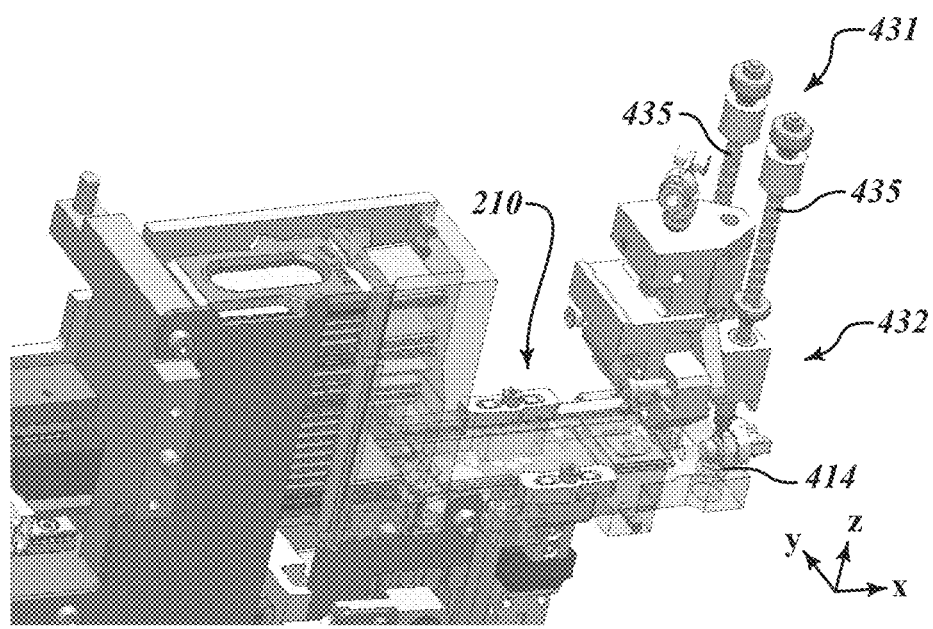
FIG. 18A is an isometric view of a slide staging device and a transfer assembly in accordance with an embodiment of the disclosed technology.

FIG. 18A is an isometric view of the staging device 210 and a transfer assembly 431 with a transfer head 432 in accordance with an embodiment of the disclosed technology. The transfer head 432 can include head alignment features 435 that can be aligned with corresponding alignment features 414. The transfer head 432 can include, without limitation, one or more joints, pins, or other features that allow desired motion. For example, the transfer head 432 can be a spring-loaded floating head with full rotational maneuverability, and a confirmatory sensor (e.g., vacuum sensor) coupled to the underside of the transfer head 432 to ensure reliable handling (e.g., pick-up, transport, drop-off, etc.) despite potential misalignment while handling.

Figure 18B:
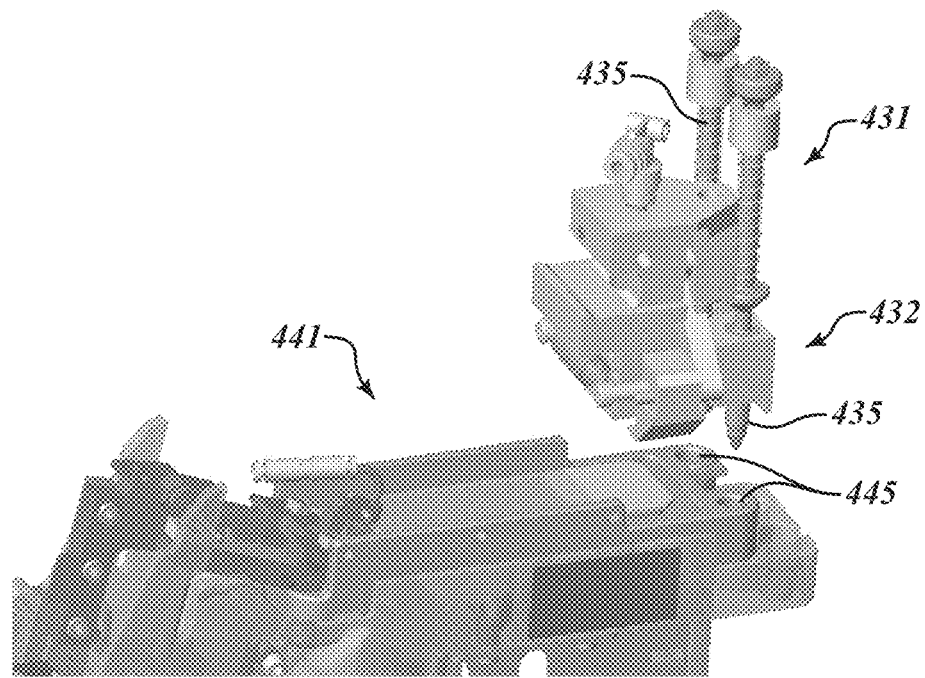
FIG. 18B is an isometric view of a specimen processing station and the transfer assembly of FIG. 18A in accordance with an embodiment of the disclosed technology.

FIG. 18B is an isometric view of a specimen processing station 441 (e.g., a wetting module) and the transfer assembly 431 in accordance with an embodiment of the disclosed technology. The floating transfer head 432 repeatedly picks up and drops off items (e.g., opposable elements, slides), and the head alignment features 435 can engage corresponding alignment features 445 to provide alignment.

Figure 18C:
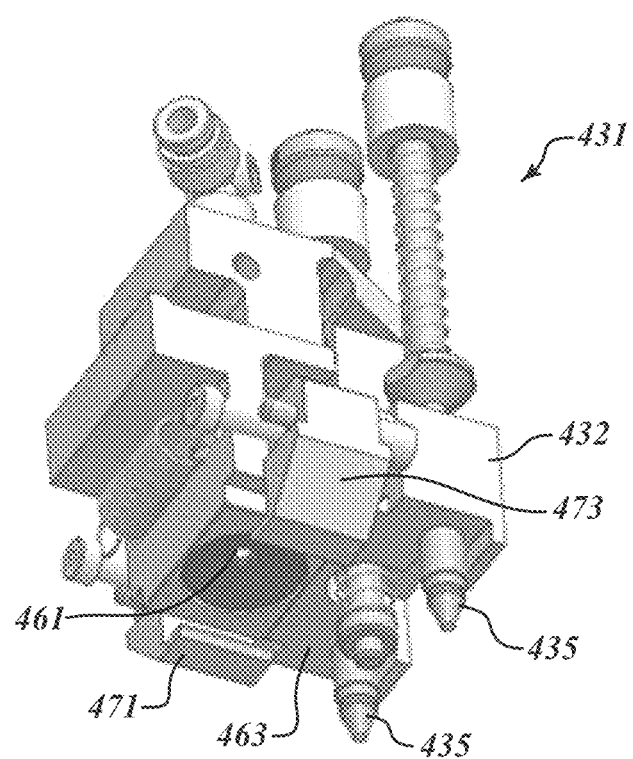
FIG. 18C is an isometric view of the transfer assembly of FIG. 18A.

FIG. 18C is an isometric view of the transfer assembly 431 in accordance with an embodiment of the disclosed technology. The transfer assembly 431 is generally similar to the transfer assembly 410 of FIGS. 17 and 18, except as detailed below. The transfer head 432 can include a vacuum port 461 on the lower surface 463. A vacuum source (not shown) can provide suction at the vacuum port 461 via supply line to pick up the slide and hold the slide during further transport, as discussed in connection with FIGS. 17 and 18. Sensors (e.g., pressure sensors, air pressure sensors, light sensors, etc.) can be provided on the lower surface 463 and/or within the vacuum port 461, the vacuum source, and/or the supply line and can detect the presence of a slide retained by movable arms or jaws 471, 473 (e.g., spring loaded jaws) of the transfer head 432. The arms 471, 473 can be moved to pick up and release items (e.g., slides, opposable elements, etc.). Successful handoff/pickup can be confirmed with dual interface vacuum sensors that preclude the transfer assembly 431 from moving on before it has successfully picked up and/or dropped off the slide (or opposable element).

In one embodiment, the floating head 432 has a gimbal on three axes (e.g., axes parallel to the illustrated X, Y and Z axes shown in FIG. 18A). In one embodiment, the head 432 has five degrees of freedom to move freely such that the alignment features 435 readily engage corresponding alignment features (e.g., corresponding alignment features 414 of FIG. 18A and corresponding alignment features 445 of FIG. 8B) on the platforms of the slide ejector departure, slide processing station and specimen return assemblies, or the like.

FIG. 19 is a block diagram illustrating a method 1000 for transferring a specimen slide using the specimen processing system 100 described above and with reference to FIGS. 19-26. With reference to FIGS. 11-19 together, the method 1000 can include moving a specimen slide 243 from a slide carrier 170 (FIG. 6) to the standby platform 240a of the staging device 210a (block 1002). The slide 243 can be moved using the ejector 212 by engaging the ejector element with the slide 243 to push the slide onto the slide holding region 250a of the standby platform 240a. The method 1000 can also include drawing a vacuum through the over-travel inhibitor 254a to stop forward movement of the slide 243 on the slide holding region 250a (block 1004). The method 1000 can further include detecting the presence of the slide 243 on the holding region 250a (block 1006). In some embodiments, the presence of the slide 243 can be detected by the controller 144 by changes in the vacuum suction of the over-travel inhibitor 254a. For example, sensors 403 (FIGS. 17 and 18) can be provided to detect the change in pressure within the vacuum port 290, fluid lines 283 and/or vacuum source 281 (see FIG. 8). In other embodiments, the presence of the slide on the standby platform 240a can be detected using other sensors 382 (e.g., pressure sensors, light sensors, motion sensors, etc.). For example, the standby platform 240a can include one more sensors 382 (e.g., position sensors, pressure sensors, light sensors) for detecting the presence of the slide 243. The method 1000 can also include aligning the slide 243 from a misaligned position to an aligned position (block 1008). For example, an actuator can move aligning members 362, 364 toward the slide 243 such that first, second and third contact regions 377, 378, 379 engage the slide to move the slide to the aligned position. Following alignment of the slide 243, the actuator can move the aligning members 362, 364 back to a starting position and away from the aligned slide. The method 1000 can further include transporting the slide 243 from the standby platform 240*a* to, for example, a specimen processing station while maintaining alignment of the slide (block 1010). For example, a transfer assembly 410 having a transfer head 412 can be aligned with the standby platform 240*a* via alignment of the head alignment features 413 on the transfer head 412 with corresponding alignment features 414 on the standby platform 240*a*. The transfer head 412 can be configured to engage, pick up and transport the slide 243 with the capture feature 416. In one embodiment, the capture feature 416 can use a vacuum provided by the vacuum source 418 via the vacuum port 417. Positive detection of the presence of the slide 243 can be confirmed by a change in vacuum pressure reported by sensor 405 to the controller 144.

Figure 20:
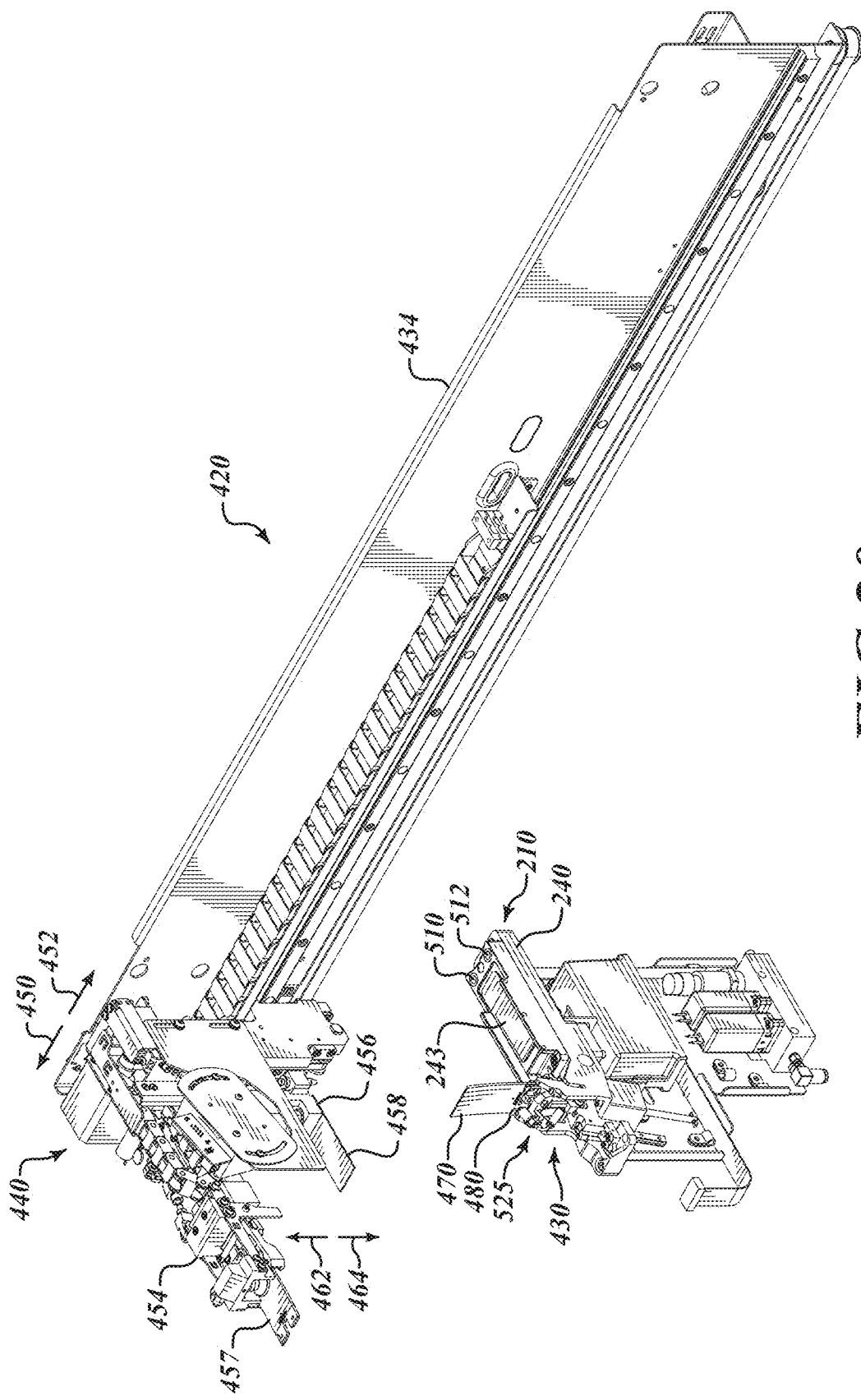
FIG. 20 is an isometric view of a transport assembly and a specimen processing station in accordance with an embodiment of the disclosed technology.

FIG. 20 shows a transport assembly 420 and a specimen processing station in the form of a slide processing station. The transport assembly 420 can include, without limitation, a drive mechanism 434 (e.g., a rack drive mechanism, a belt drive mechanism, etc.) and a lift mechanism 440. The drive mechanism 434 can move the lift mechanism 440 horizontally, as indicated by arrows 450, 452. The lift mechanism 440 can move end effectors in the form of transfer heads 454, 456 vertically, as indicated by arrows 462, 464. The transfer heads can include, without limitation, one or more suction devices (e.g., suction cups, pumps, vacuum pumps, etc.), mechanical grippers (e.g., jaws, clamps, etc.), retention features (e.g., features that prevent dropping of slides/opposables), or the like. For example, the transfer head 454 can be a pickup head (e.g., a rotatable or floating pickup head) capable of picking up and holding an opposable 457 via a vacuum. The vacuum can be reduced (e.g., eliminated) to release the opposable 457. Additionally or alternatively, a mechanical gripper can hold the opposable 457.

Figure 21:
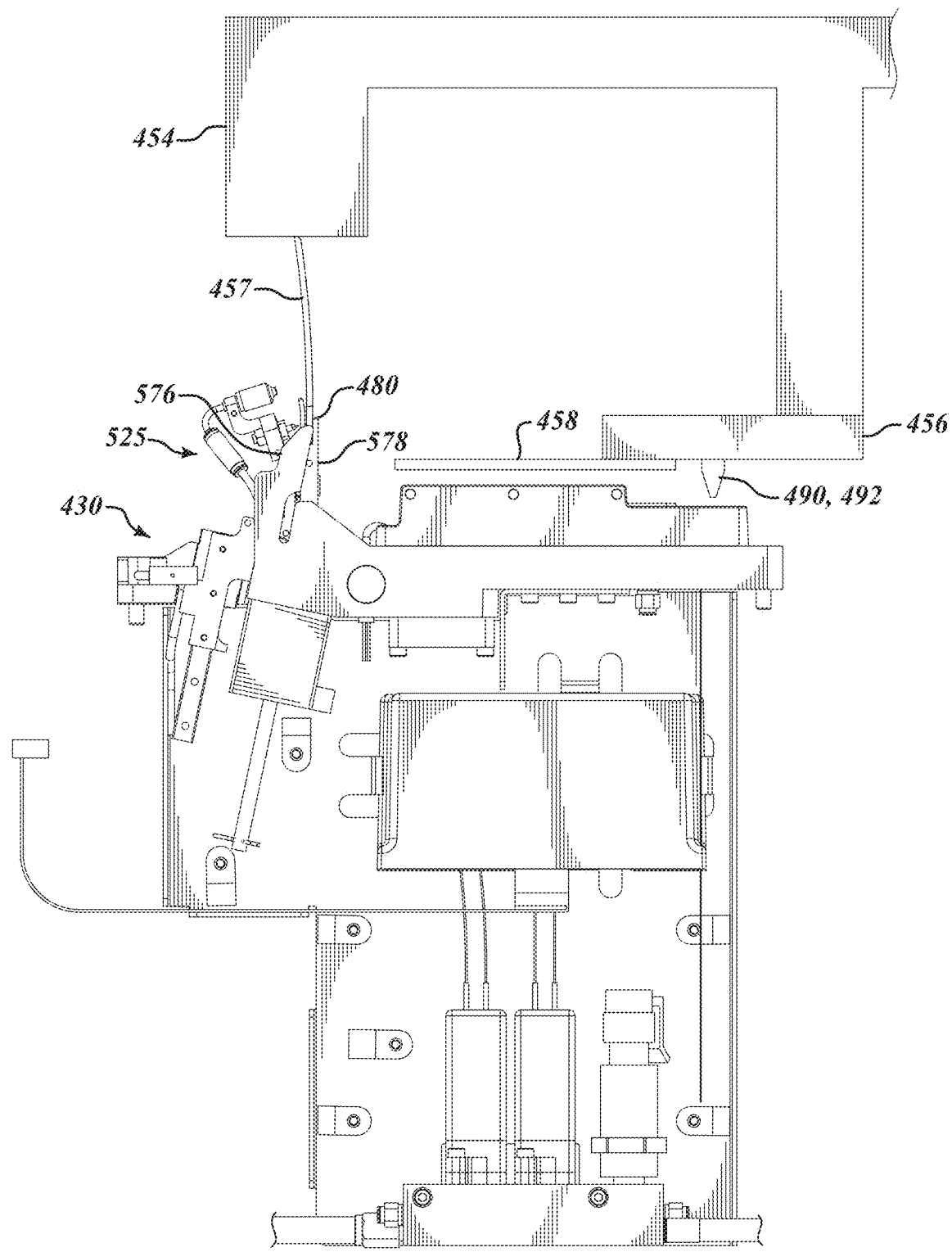
FIG. 21 is a side view of a transport assembly ready to deliver an opposable and a slide to a specimen processing station in accordance with an embodiment of the disclosed technology.

FIG. 21 shows the transfer heads 454, 456 delivering the opposable 457 and slide 458, respectively, to the wetting module 430. The transfer head 456 includes head alignment features 490, 492 receivable by complementary alignment features 500, 502 (FIG. 20) of the standby platform 240 and/or alignment features 510, 512 (FIG. 30) of the wetting module 430. Alignment features can include, without limitation, pins (e.g., elongate rods), protrusions, openings (e.g., openings defined by bushings, openings in plates, etc.), or the like. In some embodiments, the alignment features 490, 492 are in the form of pins that can be inserted into corresponding alignment features 510, 512 in the form of openings to align the slide 243 with the wetting module 430. The transfer head 456 can be a floating head to limit or prevent binding between the alignment features 490, 492 and the alignment features 510, 512, respectively. In other embodiments, the alignment features 490, 492 are openings and the alignment features 510, 512 are upwardly protruding pins.

After removing the processed slide 243, the transfer head 456 can transport an unprocessed slide 458 from a staging device to the wetting module 430. The alignment features 490, 492 can be positioned above the alignment features 510, 512, and the transfer head 456 can be lowered to insert the alignment features 490, 492 into the alignment features 510, 512, respectively, until the slide 458 rests on the wetting module 430. The transfer head 456 can release the slide 458. After processing the specimen, the transfer head 456 can retrieve and load another slide into the wetting module 430. The slides can be retained at the wetting module 430 to prevent damage to the slide in the event of a power outage or other event that may affect system performance.

Figure 22A:
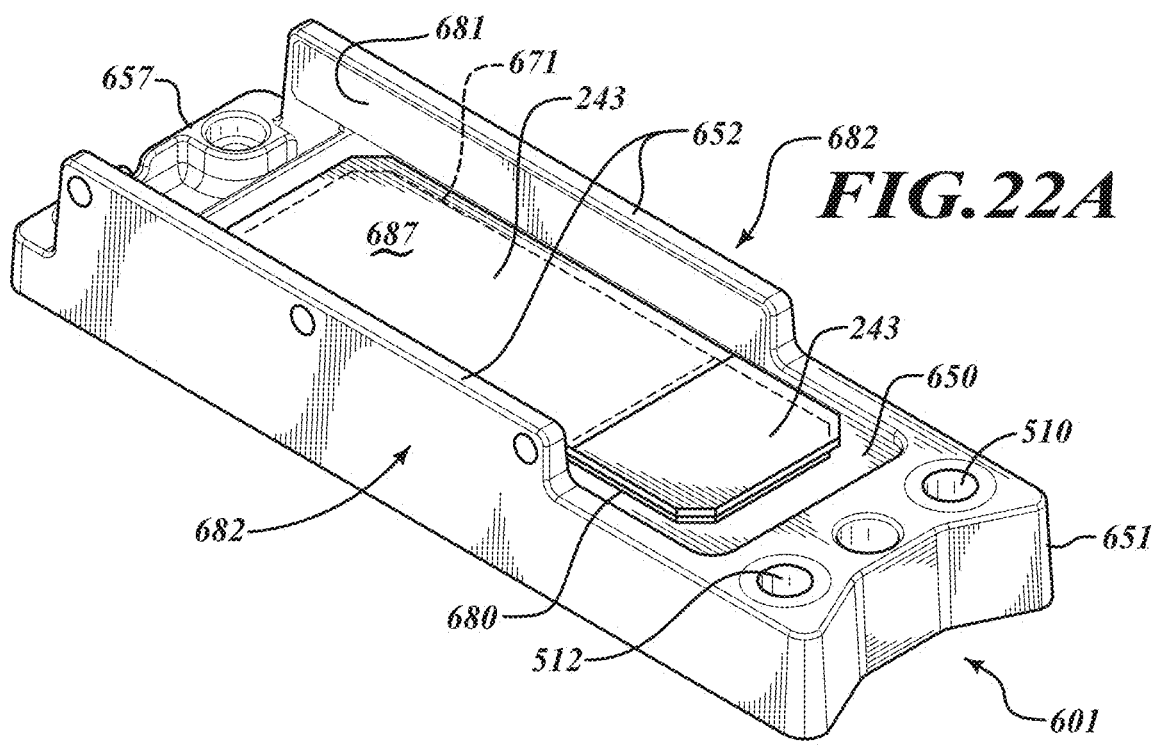
FIG. 22A is a front, top, left side isometric view of a slide holder platen holding a slide in accordance with an embodiment of the disclosed technology.
Figure 22B:
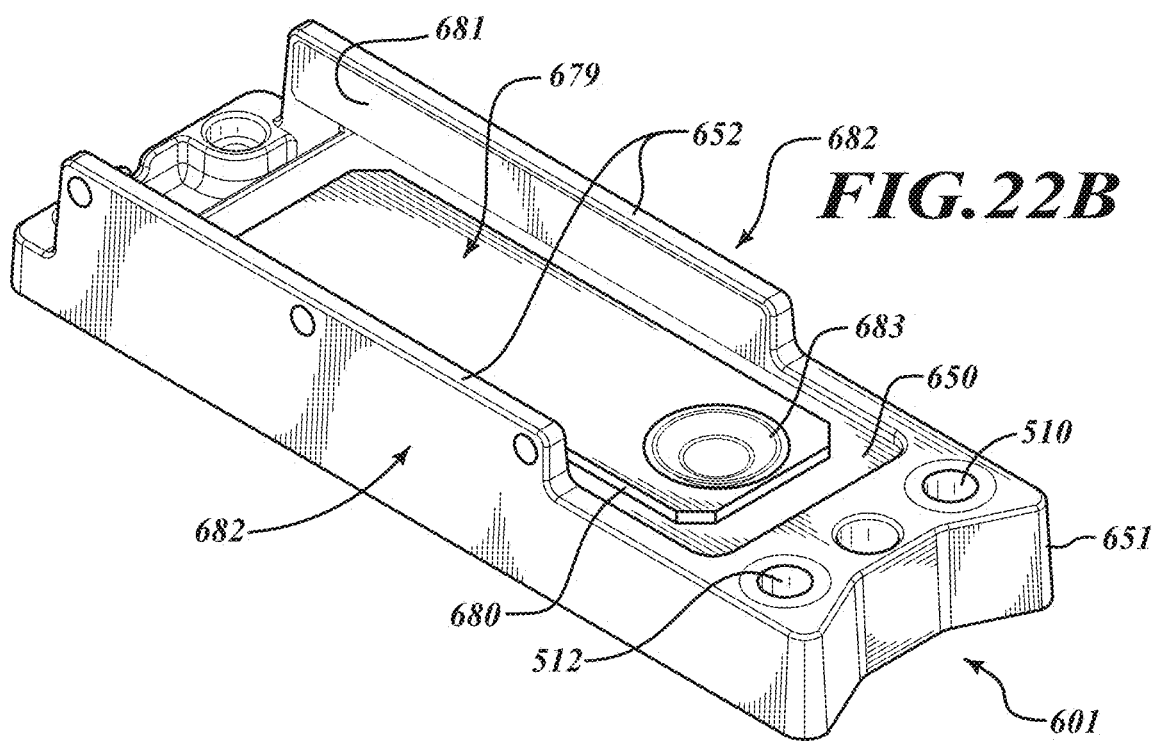
FIG. 22B is a front, top, left side isometric view of the slide holder platen of FIG. 22A ready to hold a slide in accordance with an embodiment of the disclosed technology.

FIGS. 22A and 22B are isometric views of the slide holder platen 601 in accordance with an embodiment of the present technology. The slide holder platen 601 of FIG. 22A supports the slide 243. The slide holder platen 601 of FIG. 22B is empty. The slide holder platen 601 can include a support element 650 and a mounting base 651. The support element 650 includes a raised slide receiving region 680 having a contact or contact surface 679 (FIG. 22B). A port 683 (FIG. 22B) is positioned to draw a vacuum to hold the slide 243 against the contact surface 679. The port 683 can be a suction cup or other feature configured to facilitate drawing a strong vacuum between the slide 243 against the contact surface 679. In one embodiment, one or more of the sensors 620*a*/620*b* can be configured to detect a change in pressure at the port 683 indicating the presence of the slide 243 at the contact surface 679. For example, the sensor(s) 620 can be calibrated at a baseline pressure (e.g., the pressure at the port 683 when no slide is present) and be further calibrated to detect an increase in pressure at the port 683. The increase in pressure sensed at port 683 can positively detect the presence of the slide 243 at the contact surface 679. In another embodiment, a sensor (not shown) can be positioned proximal to the port 683 and configured to detect relative changes in pressure associated with the port 683 for detection of the slide 243 at the contact surface 679.

The support element 650 includes inner walls 681 positioned in outer walls 652 of the mounting base 651. The inner and outer walls 681, 652 form heatable sidewalls 682. In some embodiments, the sidewalls 682 can be positioned on both sides of the contact surface 679 and can output heat energy to the surrounding air to control the temperature of the slide 243, processing fluid, and/or specimen(s). In some embodiments, the sidewalls 682 can also be positioned to laterally surround the entire slide 243. The mounting base 651 can be made of an insulating material (e.g., plastic, rubber, polymers, or the like) that can insulate the support element 650 from other components. In some embodiments, the mounting base 651 is made of a material with a thermal conductivity that is substantially less than the thermal conductivity of the material of the support element 650. The mounting base 651 can surround and protect the support element 650 and includes a coupling region 657 to which the opposable actuator 525 can be coupled.

Figure 23:
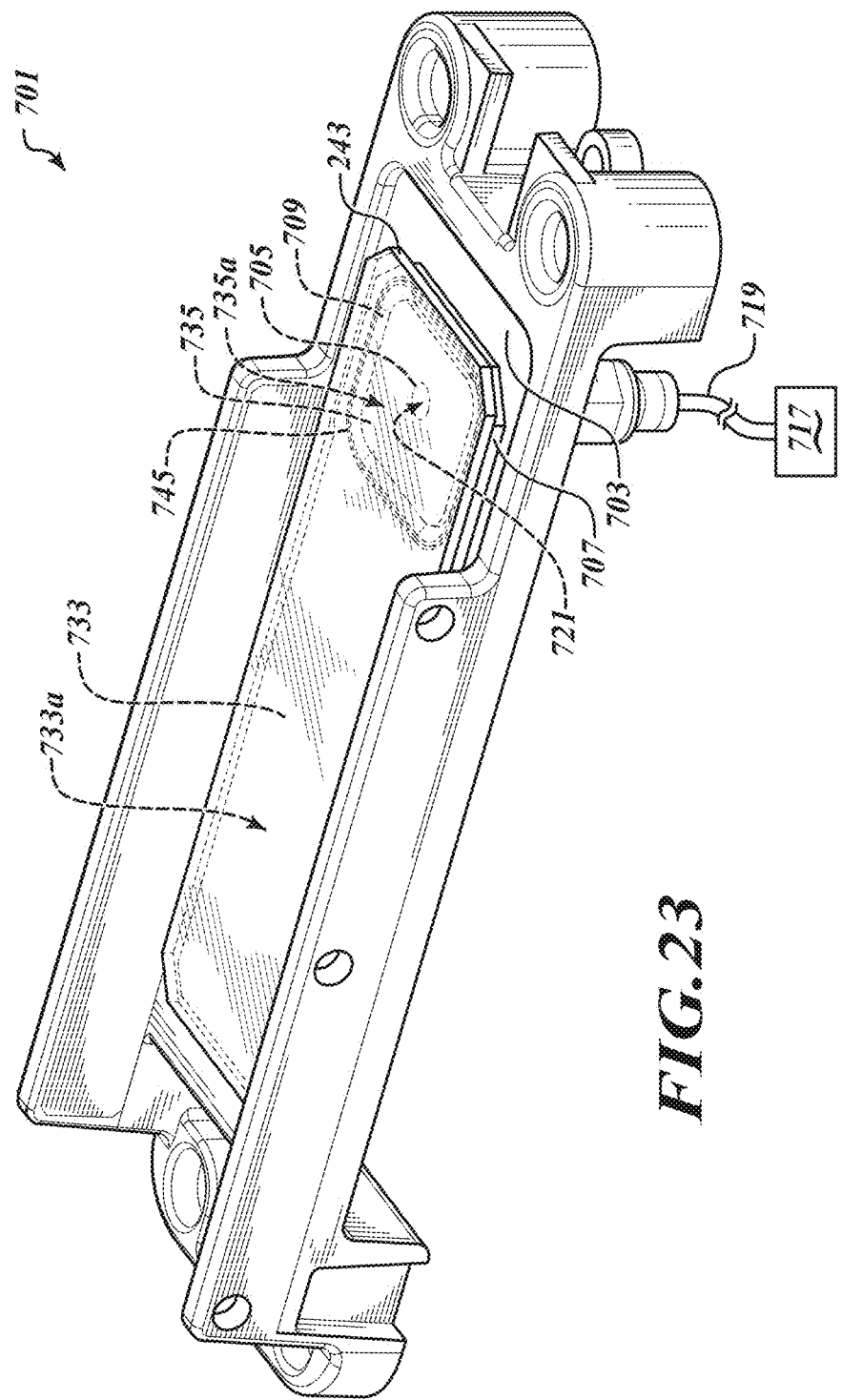
FIG. 23 is a perspective view of a slide holder platen in accordance with an embodiment of the disclosed technology, shown holding a slide.
Figure 24:
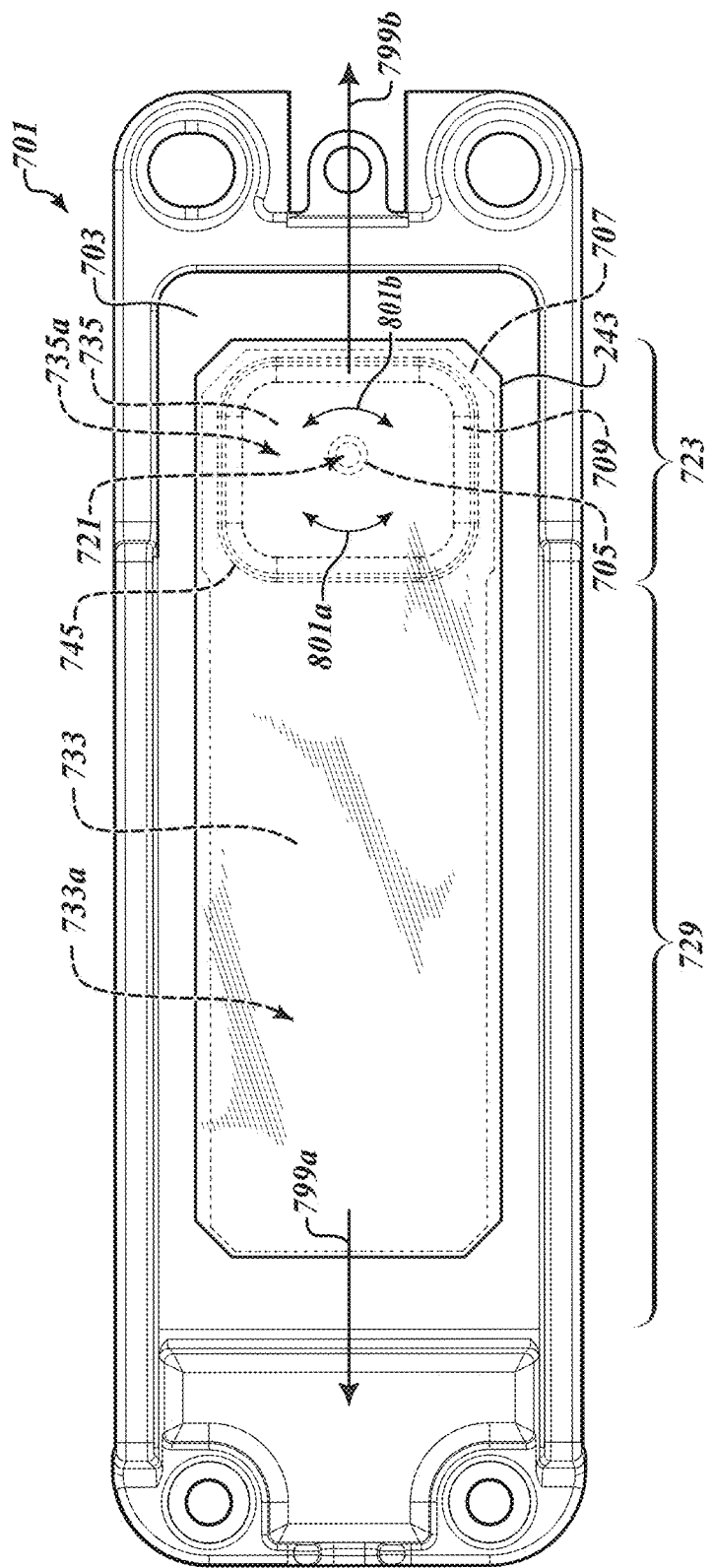
FIG. 24 is a top view of the slide holder platen shown in FIG. 23.
Figure 25:
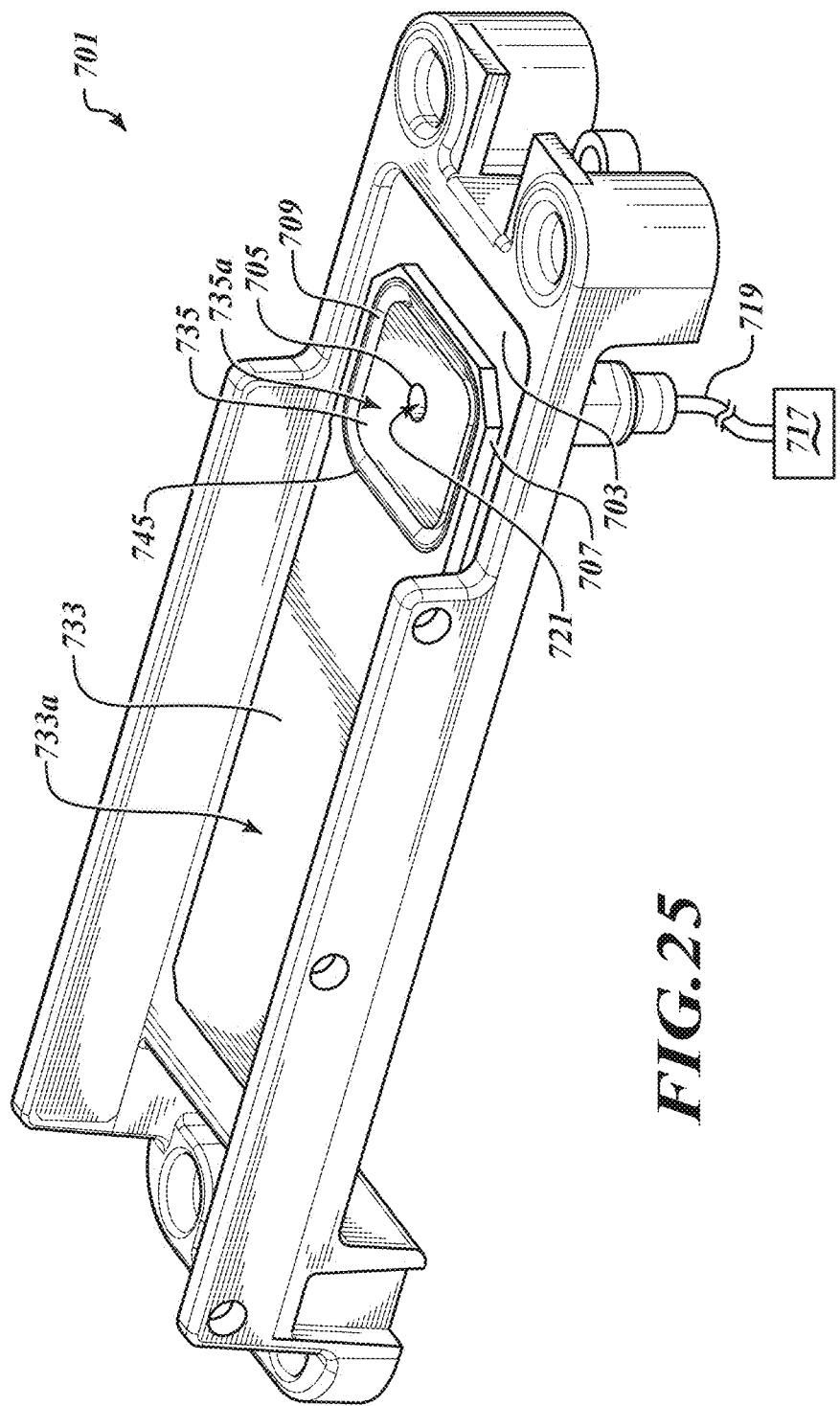
FIG. 25 is a perspective view of the slide holder platen in accordance with the disclosed technology, shown without a slide.

FIGS. 23 and 24 are perspective and top views, respectively, of another embodiment of a slide holder platen 701 shown with a slide 243 and configured in accordance with the present technology. FIG. 25 is a perspective view of the slide holder platen 701 without a slide 243. Referring to FIGS. 23-25, the slide holder platen 701 is generally identical to the slide holder platen 601 discussed above in connection with FIGS. 22A-22B, except as detailed below. The slide holder platen 701 can include a support element 703, a sealing member 709, and a vacuum port 721. The support element 703 includes a raised slide-receiving region 707, and the sealing member 709 is configured to engage a bottom surface of the slide 243 as the slide is placed on the slide-receiving region 707. The sealing member 709 can be positioned around the vacuum port 721 such that, when the slide 243 engages the sealing member 709, a vacuum is drawn via the vacuum port 721 to pull the slide 243 against the sealing member 709 to maintain a seal (e.g., an airtight seal) and prevent or limit unwanted movement (e.g., rotational movement and/or translational movement as indicated by arrows 801*a-b* and 799*a-b*, respectively, in FIG. 24) of the slide 243 relative the slide-receiving region 707.

Figure 27:
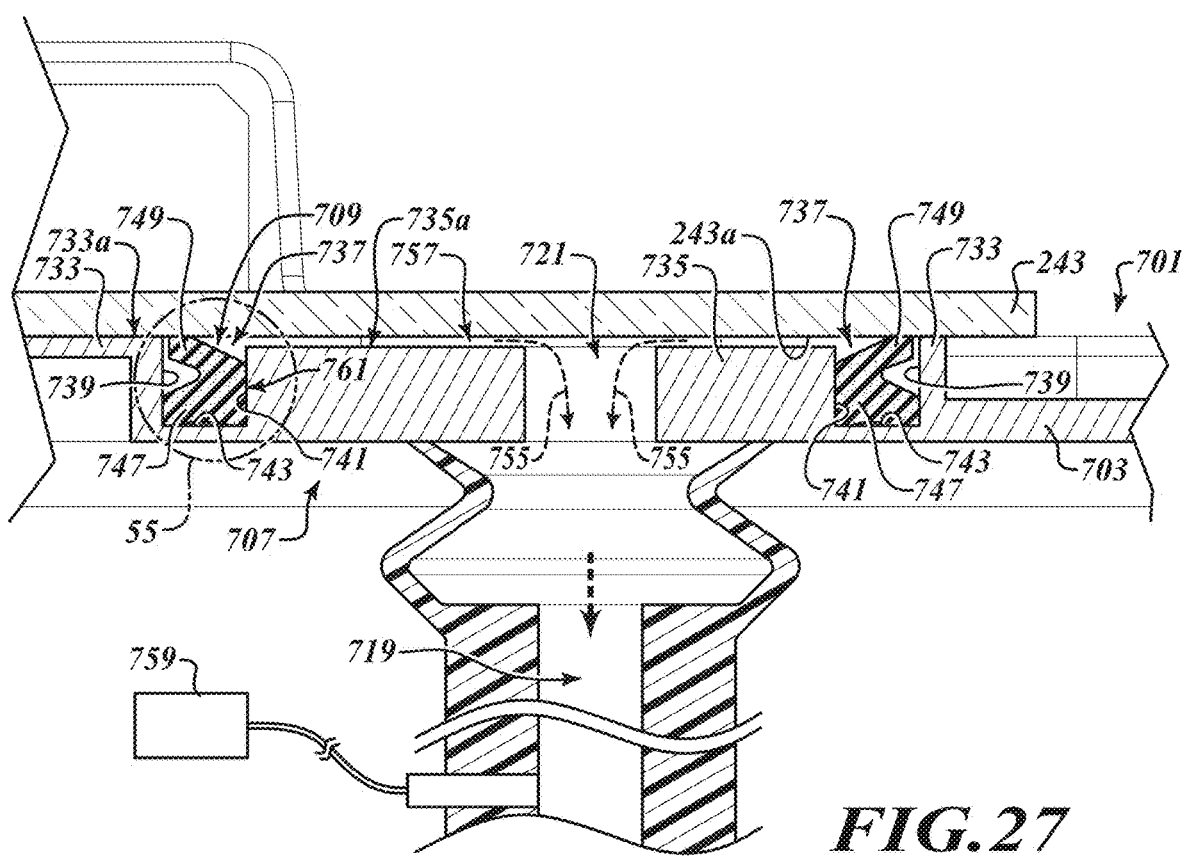
FIG. 27 is a cross-sectional side view of a portion of the slide holder platen after the slide has been positioned on the slide holder platen.

Referring now to FIG. 25, the slide-receiving region 707 can have a first portion 733 and a second portion 735 disposed within an opening 745 of the first portion 733. The vacuum port 721 can be disposed at a top surface 735*a* of the second portion 735 at a generally central location. The vacuum port 721 can be fluidically coupled to a vacuum source 717 via one or more fluid lines 719 (e.g., internal fluid lines, external fluid lines, etc.). For example, the fluid line(s) 719 can extend from an opening 705 at the top surface 735*a* through the second portion 735 to the vacuum source 717. The vacuum source 717 can include, without limitation, one or more pressurization devices, pumps, or other types of devices capable of drawing a vacuum via the opening 705. In some embodiments, a vacuum pressure sensor 759 can be provided at the vacuum port 721, the vacuum source 717 or along the fluid line(s) 719, as shown in FIG. 27. As shown in FIG. 24, when the slide 243 is positioned on the slide-receiving region 707, the specimen-bearing portion 729 of the slide 243 is generally aligned with the first portion 733, and the label-bearing portion 723 of the slide 243 is generally aligned with the second portion 735. As such, a vacuum generated by the vacuum port 721 can be localized to the label-bearing portion 723 of the slide 243 to avoid disrupting thermal processing of the specimen-bearing portion 729.

The second portion 735 and opening 745 can individually have a non-round shape (as viewed from above). As used herein, "non-round" refers to any shape other than a true circle (i.e., a shape having a substantially constant radius at every point around its perimeter). For example, in some embodiments the second portion 735 and/or opening 745 can have a rectangular shape with rounded corners. In other embodiments, the second portion 735 and/or opening 745 can have any non-round shape, size, and/or configuration, such as a rounded-corner polygonal shape, a polygonal shape, an oval, an ellipse, and the like. In some embodiments (including the illustrated embodiment), the second portion 735 and the opening 745 can have generally the same non-round shape, and in some embodiments the second portion 735 and the opening 745 can have different non-round shapes.

Figure 26:
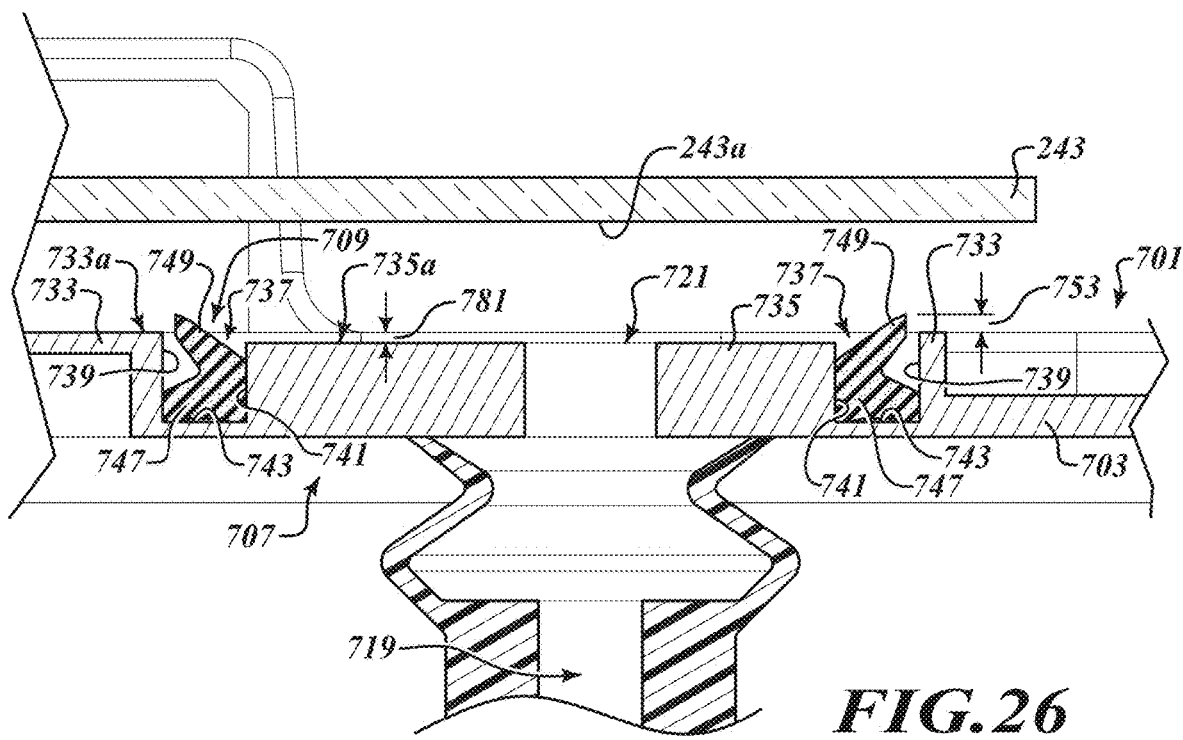
FIG. 26 is a cross-sectional side view of a portion of the slide holder platen before the slide has engaged the sealing member.

FIG. 26 is a cross-sectional side view of the platen 701 as a slide 243 is being positioned on the slide-receiving region 707 but before a backside 243*a* of the slide 243 has made contact with the sealing member 709 in an uncompressed state. As shown in FIG. 26, at least a portion of the main body 747 is in contact with the inner sidewall 741, outer sidewall 739, and floor portion 743 of the trench 737. The lip 749 is spaced apart from the outer sidewall 739 of the trench 737 and extends upwardly out of the trench 737 beyond the top surface 733*a* of the first portion 733. The lip 749 can also extends upwardly out of the trench 737 beyond the horizontal plane (imaginary plane) defined by the top surface 733*a*. For example, the lip 749 can extend a distance 753 from the top surface 733*a*. As such, the lip 749 is configured to engage the backside surface 243*a* of the slide 243 before the backside surface 243*a* contacts the top surface 733*a* of the first portion 733. This way, the sealing member 709 absorbs the contact forces associated with the placement of the slide 243 on the slide-receiving region 707, thus easing the transition of the slide 243 onto the slide-receiving region 707.

Figure 28:
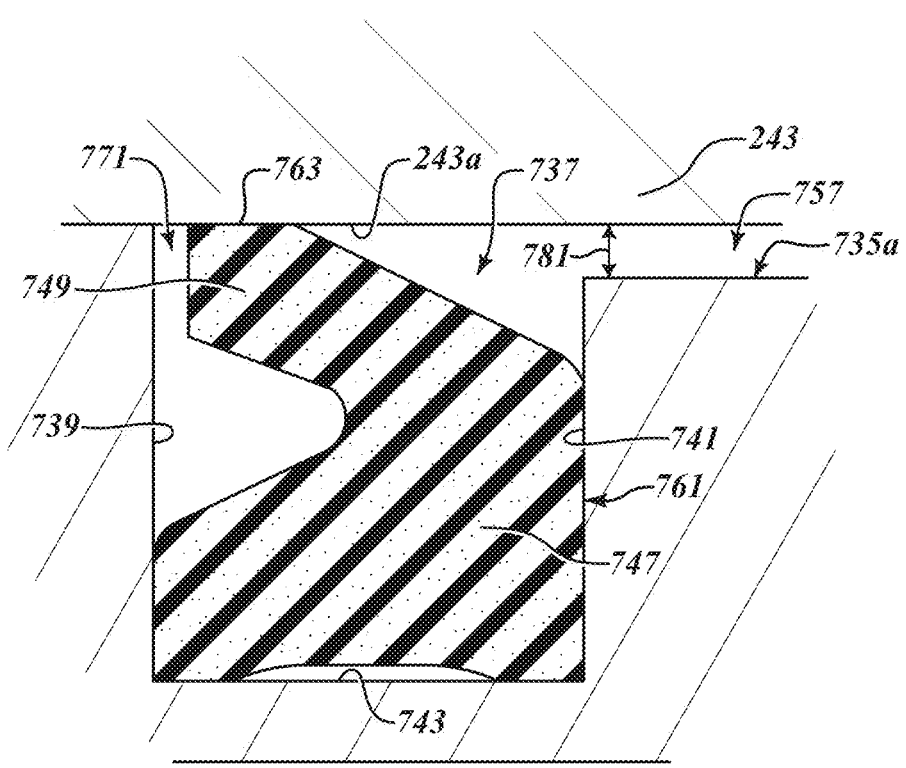
FIG. 28 is an enlarged view of a portion of the slide holder platen shown in FIG. 27.

FIG. 27 is a cross-sectional side view of the platen 701 after the slide 243 has been positioned on the slide-receiving region 707 (e.g., the sealing member 709 is in the compressed state), and FIG. 28 is an enlarged view of a portion of FIG. 27. As shown in FIG. 27, the backside surface 243*a* of the slide 243 contacts the lip 749 of the sealing member 709 as well as the top surface 733*a* of the first portion 733. Because of the height differential between the first and second portions 733, 735, the backside surface 243*a* of the slide 243 is separated from the top surface 735*a* of the second portion 735 by a distance 781 (see FIG. 28). As such, the pressurized port 721 is positioned below and spaced apart from the backside 243*a* of the slide 243 such that the top surface 735*a* of the second portion 735 and the backside surface 243*a* of the slide 243 at least partially define a vacuum chamber 757. For example, when the vacuum source is activated, fluid and/or air between the backside 243*a* of the slide 243, a portion of the sealing member 709 (e.g., lip 749 and/or exterior surface 761 of the main body 747), the inner sidewall 741, and/or the top surface 735*a* of the second portion 735 is drawn through the vacuum port 721 (as indicated by arrows 755). As a result, the slide 243 is pulled against the sealing member 709, thereby forming a seal. The seal secures the positioning of the slide 243 relative to the support element 703 and substantially eliminates unwanted rotation and/or translation of the slide 243.

The lip 749 can be movable between the uncompressed configuration and the compressed configuration without contacting the outer sidewall 739 of the trench 737. As best shown in FIG. 28, even in the compressed configuration, a gap 771 can remain between the sealing member lip 749 and the outer sidewall 739 of the trench 737. For example, the lip 749 can be configured to deflect primarily in a direction perpendicular to the backside surface 243*a* of the slide 243. The lip 749 can be sufficiently stiff to prevent any rotation of the slide 243 about a vertical axis. As such, the slide 243 can rotationally fixed relative to the support surface. Although (in the compressed state) the lip 749 can be separated from the outer sidewall 739, the lip 749 is configured to physically contact the sidewall(s) of the trench 737 to inhibit movement of the slide 243 relative to the support element 703. For example, as shown in FIG. 56, the lip 749 or other portion of the sealing member 709 can be configured to physically contact the outer sidewall 739 of the trench 737 when the slide 243 is rotated about its vertical axis (e.g., at least about 2 degrees). Because of the non-round shape of both the sealing member 709 and the opening 745 in the first portion 733, the outer sidewalls 747 of the trench 737 limit rotation of the sealing member 709 (e.g., by exerting a contact force CF) and thus the slide 743.

The slide holder platen 701 can include additional features. For example, the slide holder platen 701 can include one or more sensors 759 (FIG. 27) to detect the presence of the slide 243 and/or activate the vacuum source 717. In some embodiments, the slide holder platen 701 can include one or more sensors to monitor the pressure generated within the vacuum chamber 757. In particular embodiments, the slide holder platen 701 can be in communication with a controller that can control the timing and/or magnitude of the vacuum source 717. In one embodiment, the sensor 759 can be configured to detect a change in vacuum pressure as would occur when the slide 243 engages the sealing member 709 and the vacuum is drawn via the vacuum port 721 to pull the slide 243 against the sealing member 709 to maintain a seal (e.g., an airtight seal). Accordingly, the sensor 759 can detect the presence of the slide 243 at the slide holder platen 701.

The various embodiments described above can be combined to provide further embodiments. These and other changes can be made to the embodiments in light of the above-detailed description. For example, a seal element can have a one-piece or multi-piece construction and can include any number of retention features. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An automated specimen processing system, comprising:
   a slide staging device having a standby platform and an alignment device;
   wherein the standby platform comprises a plate including (i) a slide holding region, (ii) an over-travel inhibitor, and (iii) one or more alignment features, wherein the slide holding region is raised relative to a surface of the plate;
   wherein the alignment device comprises a first movable aligning member capable of engaging a first edge of a slide and a second movable aligning member capable of engaging a second edge of the slide when the slide is in the slide holding region, and wherein the first and second movable alignment members are coupled to an actuator adapted to simultaneously move both the first and second movable alignment members toward and away from each other;
      wherein the over-travel inhibitor comprises a first vacuum port, wherein the first vacuum port includes an opening embedded within the plate for drawing a vacuum and a first presence sensor for detecting a presence of the slide on the standby platform, wherein the opening is fluidically coupled to a first vacuum assembly including a first vacuum source, and wherein the first vacuum port includes a contact surface comprising one or more compressible materials; and
   a transfer head configured to transport the slide from the standby platform to at least one specimen processing station, wherein the transfer head comprises (i) a second vacuum port integrated within a bottom surface of the transport head, wherein the second vacuum port is fluidically coupled through a supply line to a second vacuum assembly including a second vacuum source, (ii) a second presence sensor located on the bottom surface of the transfer head or within the second vacuum port, (iii) one or more head alignment features protruding from the bottom surface of the transfer head, wherein the one or more head alignment features correspond to the one or more alignment features of the plate, and (iv) a first position sensor for detecting an alignment of the one or more head alignment features with the corresponding one or more alignment features of the slide staging device; wherein the transfer head is configured to have at least 5 degrees of freedom of movement.

2. The automated specimen processing system of claim 1, wherein the first presence sensor is pre-calibrated to a first baseline pressure, and wherein the first presence sensor is configured to detect an increase in pressure from the first baseline pressure when the slide is present on the standby platform.

3. The automated specimen processing system of claim 1, wherein the alignment device is configured to move the slide from a misaligned position to an aligned position on the standby platform.

4. The automated specimen processing system of claim 1, wherein the at least one specimen processing station includes a slide holder platen and a third vacuum port positioned to draw a third vacuum between the slide and the slide holder platen.

5. The automated specimen processing system of claim 4, further comprising:
   a controller comprising instructions to:
      command a first pressurization source to draw a first vacuum through the first vacuum port;
      command a second pressurization source to draw a second vacuum through the second vacuum port;
      command a third pressurization source to draw the third vacuum through the third vacuum port;
      receive information from the first presence sensor indicating the presence of the slide;
      receive information from the second presence sensor indicating the presence of the slide; and
      command the first pressurization source to reduce the first vacuum upon receiving information from the second presence sensor indicating the presence of the slide.

6. The automated specimen processing system of claim 5, wherein the controller is further programmed to command the transfer head to align with the slide staging device and to transport the slide from the standby platform to the specimen processing station.

7. The automated specimen processing system of claim 6, wherein the controller is further programmed to receive information from the second presence sensor indicating the presence of the slide and to command the third pressurization source to reduce the third vacuum.

8. The automated specimen processing system of any of claim 1, further comprising a specimen return mechanism configured to load the slide into a slide carrier, the specimen return mechanism having a slide holding surface and a vacuum assembly configured to draw a fourth vacuum between the slide and the slide holding surface.

9. The automated specimen processing system of claim 1, wherein the one or more head alignment features comprise one or more alignment pins.

10. The automated specimen processing assembly of claim 9, wherein the one or more alignment features of the slide staging device comprise one or more openings for receiving the one or more alignment pins.

* * * * *